US012573620B2

(12) United States Patent
Kim et al.

(10) Patent No.: US 12,573,620 B2
(45) Date of Patent: Mar. 10, 2026

(54) ANODE FOR ALL-SOLID SECONDARY BATTERY, ALL-SOLID SECONDARY BATTERY INCLUDING THE SAME, AND MANUFACTURING METHOD THEREOF

(71) Applicants: Samsung Electronics Co., Ltd., Suwon-si (KR); Seoul National University R&DB Foundation, Seoul (KR)

(72) Inventors: Sewon Kim, Suwon-si (KR); Kisuk Kang, Seoul (KR); Kyeongsu Lee, Suwon-si (KR); Myeonghwan Lee, Sokcho-si (KR); Sangwook Han, Seoul (KR)

(73) Assignees: SAMSUNG ELECTRONICS CO., LTD., Gyeonggi-Do (KR); SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 623 days.

(21) Appl. No.: 17/982,644

(22) Filed: Nov. 8, 2022

(65) Prior Publication Data

US 2023/0146632 A1 May 11, 2023

Related U.S. Application Data

(60) Provisional application No. 63/277,807, filed on Nov. 10, 2021.

(30) Foreign Application Priority Data

Dec. 10, 2021 (KR) ........................ 10-2021-0176944

(51) Int. Cl.
| | |
|---|---|
| *H01M 4/134* | (2010.01) |
| *H01M 4/04* | (2006.01) |
| *H01M 4/36* | (2006.01) |
| *H01M 4/38* | (2006.01) |
| *H01M 4/40* | (2006.01) |
| *H01M 10/0562* | (2010.01) |
| *H01M 4/02* | (2006.01) |

(52) U.S. Cl.
CPC ......... *H01M 4/405* (2013.01); *H01M 4/0404* (2013.01); *H01M 4/364* (2013.01); *H01M 4/382* (2013.01); *H01M 10/0562* (2013.01); *H01M 2004/021* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 6,485,622 | B1 | 11/2002 | Fu |
| 6,502,795 | B2 | 1/2003 | Wada |
| 7,273,682 | B2 | 9/2007 | Park et al. |
| 7,901,658 | B2 | 3/2011 | Weppner et al. |
| 7,914,932 | B2 | 3/2011 | Yoshida et al. |
| 8,828,580 | B2 | 9/2014 | Visco et al. |
| 8,865,355 | B2 | 10/2014 | Iriyama et al. |
| 9,034,524 | B2 | 5/2015 | Moon et al. |
| 9,531,036 | B2 | 12/2016 | Ohta et al. |
| 9,559,396 | B2 | 1/2017 | Lee et al. |
| 9,761,905 | B2 | 9/2017 | Eisele et al. |
| 9,859,559 | B2 | 1/2018 | Kim et al. |
| 10,033,066 | B2 | 7/2018 | Nemori et al. |
| 10,109,851 | B2 | 10/2018 | Song et al. |
| 10,128,533 | B2 | 11/2018 | Yamamoto et al. |
| 10,135,084 | B2 | 11/2018 | Lee et al. |
| 10,734,648 | B2 | 8/2020 | Zhamu et al. |
| 10,985,407 | B2 | 4/2021 | Suzuki et al. |
| 2005/0186469 | A1* | 8/2005 | De Jonghe ............ H01M 4/387 429/231.95 |
| 2006/0019167 | A1* | 1/2006 | Li ..................... H01M 10/0561 429/188 |
| 2016/0164138 | A1 | 6/2016 | Han et al. |

(Continued)

FOREIGN PATENT DOCUMENTS

| | | |
|---|---|---|
| JP | 3244291 B2 | 1/2002 |
| JP | 5144845 B2 | 2/2013 |

(Continued)

OTHER PUBLICATIONS

Deng et al., "Tuning the Anode-Electrolyte Interface Chemistry for Garnet-Based Solid-State Li Metal atteries", Advanced Materials, 2020, 32, 2000030.

Duan et al. "Building an Air Stable and Lithium Deposition Regulable Garnet Interface from Moderate-Temperature Conversion Chemistry", Angew. Chem. Int. Ed, 2020,59, 12069-12075.

Fu et al., "In situ formation of a bifunctional interlayer enabled by a conversion reaction to initiatively prevent lithium dendrites in a garnet solid electrolyte", Energy & Environmental Science, 2019, 12, 1404.

Krauskopf et al. "Diffusion Limitation of Lithium Metal and Li—Mg Alloy Anodes on LLZO Type Solid Electrolytes as a Function of Temperature and Pressure", Advanced Energy Materials, 2019, 9, 1902568.

(Continued)

*Primary Examiner* — Yoshitoshi Takeuchi

(74) *Attorney, Agent, or Firm* — CANTOR COLBURN LLP

(57) ABSTRACT

An anode-solid electrolyte sub-assembly for an all-solid secondary battery, the anode-solid electrolyte sub-assembly including: an anode current collector; an anode material layer on the anode current collector; and a solid electrolyte on the anode material layer and opposite the current collector, wherein the anode material layer includes an interlayer, which contacts the solid electrolyte and includes a composite including a first metal material; and a first anode active material layer on the interlayer and opposite the anode current collector, the first anode active material layer including a lithium metal, a lithium alloy, or a combination thereof, wherein the lithium metal or the lithium alloy have a particle size greater than the particle size of the first metal material.

20 Claims, 16 Drawing Sheets

(56) References Cited

U.S. PATENT DOCUMENTS

| | | | |
|---|---|---|---|
| 2017/0025705 A1 | 1/2017 | Miara et al. | |
| 2017/0317352 A1* | 11/2017 | Lee | H01M 10/0569 |
| 2018/0006326 A1 | 1/2018 | O'Neill et al. | |
| 2018/0123167 A1 | 5/2018 | Yi et al. | |
| 2018/0205112 A1 | 7/2018 | Thomas-Alyea et al. | |
| 2018/0301754 A1 | 10/2018 | Badding et al. | |
| 2018/0316051 A1* | 11/2018 | Lee | H01M 50/446 |
| 2019/0044186 A1 | 2/2019 | Kim et al. | |
| 2019/0081351 A1* | 3/2019 | Kim | H01M 4/625 |
| 2019/0088993 A1 | 3/2019 | Ohta | |
| 2019/0148766 A1 | 5/2019 | Antonopoulos | |
| 2019/0207252 A1 | 7/2019 | Badding et al. | |
| 2019/0348672 A1* | 11/2019 | Wang | H01M 4/405 |
| 2019/0393482 A1* | 12/2019 | He | H01M 4/0402 |
| 2019/0393485 A1* | 12/2019 | He | H01M 4/382 |
| 2019/0393486 A1* | 12/2019 | He | H01M 4/1395 |
| 2019/0393505 A1 | 12/2019 | Suzuki et al. | |
| 2019/0393541 A1* | 12/2019 | Jang | H01M 10/0565 |
| 2019/0393542 A1* | 12/2019 | Jang | H01M 10/0566 |
| 2020/0006806 A1 | 1/2020 | Allenic et al. | |
| 2020/0083562 A1 | 3/2020 | Kim et al. | |
| 2020/0144664 A1 | 5/2020 | Kim et al. | |
| 2020/0270143 A1 | 8/2020 | Ohta et al. | |
| 2020/0328459 A1 | 10/2020 | Sakai et al. | |
| 2020/0328465 A1 | 10/2020 | Sakaida et al. | |
| 2020/0343580 A1* | 10/2020 | Yushin | H01M 10/0565 |
| 2020/0395618 A1* | 12/2020 | Rangasamy | H01M 4/628 |
| 2020/0403267 A1* | 12/2020 | Li | H01M 4/131 |
| 2021/0043966 A1 | 2/2021 | Gwon et al. | |
| 2021/0098825 A1 | 4/2021 | Sakaida et al. | |
| 2021/0119203 A1 | 4/2021 | Kim et al. | |
| 2021/0126258 A1* | 4/2021 | Bell | H01M 4/0435 |
| 2021/0242490 A1* | 8/2021 | Ku | H01M 10/0562 |
| 2021/0280853 A1* | 9/2021 | Kim | H01M 10/0585 |
| 2021/0344082 A1* | 11/2021 | Beck | H01M 50/46 |
| 2021/0376378 A1 | 12/2021 | Jung et al. | |
| 2022/0158179 A1* | 5/2022 | Hermann | H01M 4/382 |
| 2022/0263111 A1* | 8/2022 | Li | H01M 4/0407 |
| 2023/0075536 A1* | 3/2023 | Saimen | H01M 4/38 |
| 2023/0146632 A1 | 5/2023 | Kim et al. | |
| 2023/0155167 A1 | 5/2023 | Kim et al. | |
| 2024/0055647 A1* | 2/2024 | Scordilis-Kelley | H01M 4/505 |
| 2025/0023056 A1* | 1/2025 | Bae | H01M 4/405 |

FOREIGN PATENT DOCUMENTS

| | | |
|---|---|---|
| JP | 2019160407 A | 9/2019 |
| KR | 1020140108380 A | 9/2014 |
| KR | 1020190028848 A | 3/2019 |
| KR | 1020200028165 A | 3/2020 |
| KR | 102111482 B1 | 5/2020 |
| WO | 2019135319 A1 | 7/2019 |
| WO | 2020070956 A1 | 4/2020 |
| WO | 2020072524 A1 | 4/2020 |
| WO | 2020176905 A1 | 9/2020 |

OTHER PUBLICATIONS

Lou et al., "Achieving efficient and stable interface between metallic lithium and garnet-type solid electrolyte through a thin indium tin oxide interlayer", Journal of Power Sources, 448, 2020, 227440.

Meng et al. "Li2CO3-affiliative mechanism for air-accessible interface engineering of garnet electrolyte via facile liquid metal painting", Nature Coomunications, 2020.

Pathak et al., "Fluorinated hybrid solid-electrolyte-interphase for dendrite-free lithium deposition", Nature Communications, 2020.

Ruan et al. "A 3D Cross-Linking Lithiophilic and Electronically Insulating Interfacial Engineering for Garnet-Type Solid-State Lithium Batteries", Advanced Materials, 2021, 31, 2007815.

Ruan et al., "Acid induced conversion towards a robust and lithiophilic interface for Li—Li7La3Zr2O12 solid-state batteries", Journal of Material s Chemistry A, ,2019, 7, 14565.

Zhong et al., "A Highly Efficient All-Solid-State Lithium/ Electrolyte Interface Induced by an Energetic Reaction", Angew. Chem. Int. Ed., 2020, 59, 14003-14008.

Tu et al., "Fast ion transport at solid-solid interfaces in hybrid batery anodes", Nature Energy, vol. 3., Apr. 2018, 310-31.

* cited by examiner

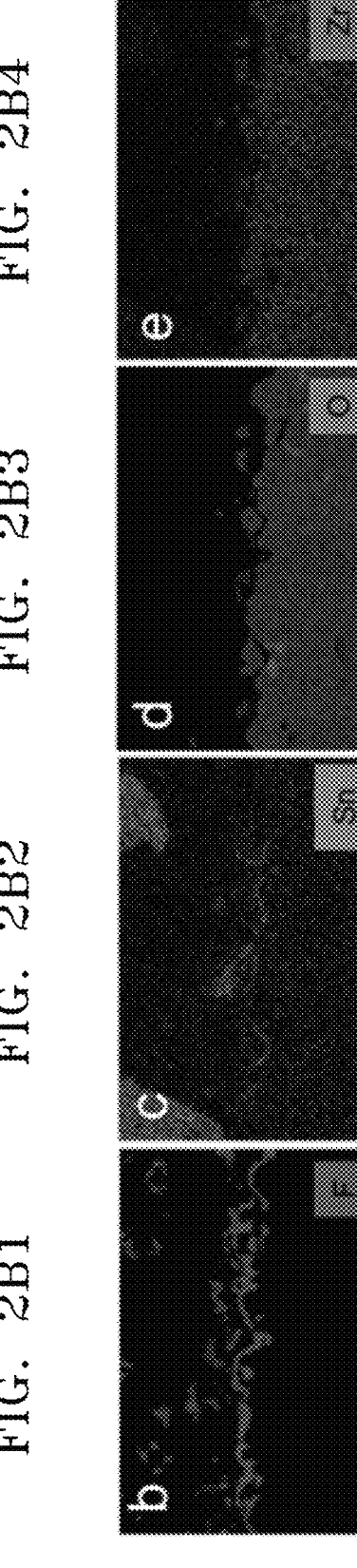
FIG. 2B1     FIG. 2B2     FIG. 2B3     FIG. 2B4

FIG. 2C1
Distance (μm) FIG. 2C2
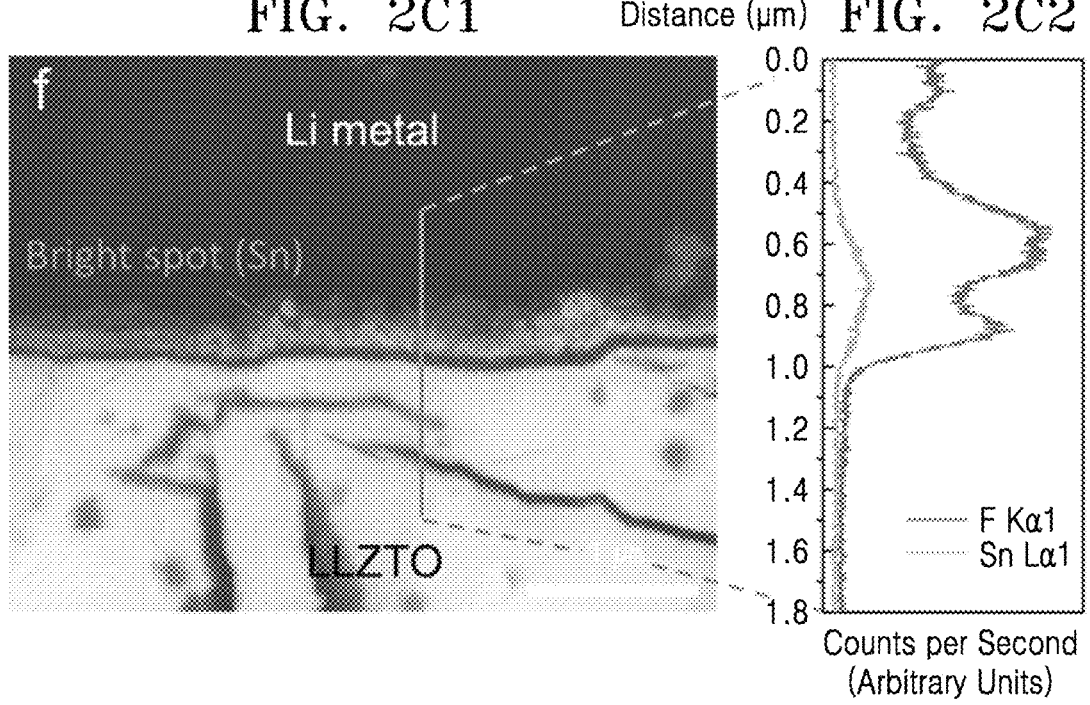
Counts per Second
(Arbitrary Units)

Example 1

Comparative Example 1

ANODE FOR ALL-SOLID SECONDARY BATTERY, ALL-SOLID SECONDARY BATTERY INCLUDING THE SAME, AND MANUFACTURING METHOD THEREOF

CROSS-REFERENCE TO RELATED APPLICATIONS

This application is based on and claims priority to U.S. Provisional Application No. 63/277,807, filed on Nov. 10, 2021, in the US Patent and Trademark Office, and Korean Patent Application No. 10-2021-0176944, filed on Dec. 10, 2021, in the Korean Intellectual Property Office, and all the benefits accruing therefrom under 35 U.S.C. § 119, the contents of which are incorporated by reference herein in their entirety.

BACKGROUND

1. Field

The present disclosure relates to an anode for an all-solid secondary battery, an all-solid secondary battery including the same, and a method of manufacturing the all-solid secondary battery.

2. Description of the Related Art

All-solid secondary batteries do not use a flammable organic solvent, and thus, there is a reduced risk of fire or explosion even if a short circuit occurs. Therefore, such all-solid secondary batteries may be much safer and may have higher energy density characteristics, compared to lithium-ion batteries using liquid electrolyte.

There has been suggested a method of forming a metal active material layer for stable interface formation between a solid electrolyte and an anode current collector in an all-solid state secondary battery. Nonetheless, there remains a need for improved battery materials.

SUMMARY

Provided is an anode-solid electrolyte sub-assembly for an all-solid secondary battery, which can prevent a short circuit and has improved high-rate characteristics and life-time characteristics.

Provided is an all-solid secondary battery that has improved cell performance by including the anode-solid electrolyte sub-assembly described above, and a method of manufacturing the all-solid secondary battery.

Additional aspects will be set forth in part in the description which follows and, in part, will be apparent from the description, or may be learned by practice of the presented embodiments of the disclosure.

According to an embodiment, provided is an anode-solid electrolyte sub-assembly for an all-solid secondary battery, including: an anode current collector and an anode material layer on the anode current collector; and a solid electrolyte on the anode material layer and opposite the current collector, wherein the anode material layer includes an interlayer, which contacts the solid electrolyte and includes a composite including a first metal material and a lithium ion conductor; and a first anode active material layer on the interlayer and opposite the anode current collector, the first anode active material layer including a lithium metal, a lithium alloy, or a combination thereof, wherein the lithium metal or the lithium alloy have a particle size greater than the particle size of the first metal material, and wherein the first metal material includes a first metal that forms an alloy or a compound with lithium, a lithium-first metal alloy including the first metal and lithium, or a combination thereof.

The first metal material in the interlayer may have a particle size of about 0.1 nanometer to about 300 nanometers, and the lithium alloy of the first anode active material layer may have a size of about 0.1 micrometer to about 20 micrometers. The interlayer may have a thickness of about 5 micrometers or less, and the first anode active material layer may have a thickness of about 1 micrometer to about 100 micrometers.

The composite of the interlayer may include the first metal material dispersed in a matrix including a lithium-ion conductor.

The first anode active material layer may include the lithium metal and the lithium alloy, the lithium alloy may be dispersed in the lithium metal, and the lithium alloy and the lithium metal may be in a form of a mixture.

In an embodiment, the interlayer may include LiF and $Li_xSn$, wherein $0<x<5$, and wherein the LiF and $Li_xSn$ have a particle size of about 0.1 nanometer to about 300 nanometers, and wherein the first anode active material layer may include lithium metal and $Li_ySn$, wherein $0<y<5$, wherein the lithium metal and $Li_ySn$ have a particle size of about 0.1 micrometer to about 20 micrometers.

A content of the lithium ion conductor in the composite of the interlayer may be about 0.1 part by weight to about 95 parts by weight, based on 100 parts by weight of the composite, and a content of the lithium alloy in the first anode active material layer may be about 0.1 part by weight to about 95 parts by weight, based on 100 parts by weight of a total weight of the first anode active material layer.

The first metal material of the interlayer may be a lithium alloy, and the lithium alloy may include a same composition as a composition of the lithium alloy of the first anode active material layer.

The sub-assembly may further include a second anode active material layer between the anode current collector and the first anode active material layer.

The second anode active material layer may include a third metal, wherein the third metal may be lithium, silver, tin, indium, silicon, gallium, aluminum, titanium, zirconium, niobium, germanium, antimony, bismuth, zinc, gold, platinum, palladium, nickel, iron, cobalt, chromium, magnesium, cesium, lanthanum, tungsten, tellurium, a lithium alloy include lithium and silver, tin, indium, silicon, gallium, aluminum, titanium, zirconium, niobium, germanium, antimony, bismuth, zinc, gold, platinum, palladium, nickel, iron, cobalt, chromium, magnesium, cesium, lanthanum, tungsten, tellurium, or a combination thereof.

According to an embodiment, provided is an all-solid secondary battery including: a cathode; and the anode-solid electrolyte sub-assembly on the cathode.

The solid electrolyte may include an oxide solid electrolyte, a sulfide solid electrolyte, or a combination thereof, wherein the oxide solid electrolyte may be $Li_{1+x+y}Al_xTi_{2-x}Si_yP_{3-y}O_{12}$ wherein $0<x<2$ and $0\leq y<3$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_{1-p}Ga_p)_x(Ti_{1-q}Ge_q)_{2-x}Si_yP_{3-y}O_{12}$ wherein $0\leq x\leq1$, $0\leq y\leq1$, $0\leq p\leq1$, and $0\leq q\leq1$, $Li_xLa_yTiO_3$ wherein $0<x<2$ and $0<y<3$, $Li_2O$, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ wherein M is Te, Nb, Zr, or a combination thereof, and x is an integer of 1 to 10, or a combination thereof.

The oxide solid electrolyte may be a garnet-type solid electrolyte, and the garnet-type solid electrolyte including an oxide represented by Formula 1

$$(Li_xM1_y)(M2)_{3-\delta}(M3)_{2-\omega}O_{12-z}X_z \qquad \text{Formula 1}$$

wherein, in Formula 1, M1 is hydrogen, iron, gallium, aluminum, boron, beryllium, or a combination thereof, M2 is barium, calcium, strontium, yttrium, bismuth, praseodymium, neodymium, actinium, samarium, gadolinium, or a combination thereof, M3 is hafnium, tin, niobium, titanium, vanadium, chromium, manganese, cobalt, nickel, copper, molybdenum, tungsten, tantalum, magnesium, technetium, ruthenium, palladium, iridium, scandium, cadmium, indium, antimony, tellurium, thallium, platinum, silicon, aluminum, or a combination thereof, $6 \leq x \leq 8$, $0 \leq y < 2$, $-0.2 \leq \delta \leq 0.2$, $-0.2 \leq \omega \leq 0.2$, and $0 \leq z \leq 2$, $a1+a2=1$, $0 < a1 \leq 1$, and $0 \leq a2 < 1$, $b1+b2=1$, $0 < b1 < 1$, and $0 < b2 < 1$, and X is a monovalent anion, a divalent anion, a trivalent anion, or a combination thereof.

According to an embodiment, provided is a method of manufacturing an anode-solid electrolyte sub-assembly, the method including: providing a solid electrolyte; and disposing an anode on the solid electrolyte, wherein the disposing of the anode includes providing a composition including a compound including a first metal and a halogen on a first surface of the solid electrolyte to provide a composite layer, disposing a lithium metal on the composite layer to form a lithium coated composite layer, heat treating the lithium coated composite layer to form an interlayer, wherein the interlayer includes a first metal material having a particle size of about 0.1 nanometer to about 300 nanometers and a lithium ion conductor, and disposing a first anode active material layer on the interlayer to dispose the anode and manufacture the anode-solid electrolyte sub-assembly, wherein the first anode active material layer includes a lithium metal, a lithium alloy, or a combination thereof, wherein the lithium metal or the lithium alloy have a particle size of about 0.1 micrometer to about 20 micrometers.

According to an embodiment, provided is a method of manufacturing an all-solid secondary battery, the method including: providing a cathode; disposing a solid electrolyte on the cathode; and disposing an anode on the solid electrolyte opposite the cathode wherein the disposing of the anode includes providing a composition including a compound of a first metal and a halogen on a first surface of the solid electrolyte to provide a composite layer, disposing lithium metal on the composite layer to form a lithium coated composite layer, heat treating the lithium coated composite layer to form an interlayer, wherein the interlayer includes a first metal material having a particle size of about 0.1 nanometer to about 300 nanometers and a lithium ion conductor, and disposing a first anode active material layer on the interlayer to dispose the anode and manufacture the all-solid secondary battery, wherein the first anode active material layer includes a lithium metal, a lithium alloy, or a combination thereof, and wherein the lithium metal or the lithium alloy have a particle size of about 0.1 micrometer to about 20 micrometers.

The heat treating may include heat treating at a temperature of greater than about 150° C., or at a temperature of about 190° C. to about 250° C.

The compound of the first metal and the halogen may be $SnF_x$ wherein $0 < x \leq 6$, $SnCl_x$ wherein $0 < x \leq 6$, $SnBr_x$ wherein $0 < x \leq 6$, $SnI_x$ wherein $0 < x \leq 6$, $BiCl_3$, $Bi_6Cl_7$, $BiBr_x$ wherein $0 < x \leq 6$, $BiF_x$ wherein $0 < x \leq 6$, $BiI_x$ wherein $0 < x \leq 6$, $AgF_x$ wherein $0 < x \leq 4$, $AgCl_x$ wherein $0 < x \leq 2$, $AgBr_x$ wherein $0 < x \leq 2$, $AgI_x$ wherein $0 < x \leq 2$, or a combination thereof.

4

The first metal material of the interlayer may be a lithium alloy having a particle size of about 0.1 nanometer to about 300 nanometers.

The method may further include disposing a second anode active material layer between the anode current collector and the first anode active material layer, and the method may include forming a precipitation layer by charging the all-solid secondary battery, or by assembling the all-solid secondary battery, to dispose the second anode active material layer.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B1 illustrates the results of energy dispersive X-ray spectroscopy (EDS) for fluorine (F);

FIG. 2B2 illustrates the results of EDS for tin (Sn);

FIG. 2B3 illustrates the results of EDS for oxygen (O);

FIG. 2B4 illustrates the results of EDS for zirconium (Zr);

FIG. 2C1 shows the results of a high-resolution cross-sectional SEM analysis of the interface;

FIG. 2C2 is a graph of distance (micrometers, μm) vs. counts per second (arbitrary units) and illustrates a line profile of elements F and Sn;

FIG. 3 is a graph of imaginary impedance (Z″, ohms square centimeter, 0 cm²) vs. real impedance (Z′, Ωcm²) that shows results of impedance measurement on lithium symmetric cells obtained by stacking lithium metal on either surface of the anode-solid electrolyte sub-assembly manufactured according to Example 1, Comparative Example 1, and Comparative Example 2;

FIG. 4 is a graph of voltage (Volts vs. Li/Li⁺) vs. time (hour, h) and shows results of critical current density (CCD) measurement on the lithium symmetric cells obtained by stacking lithium metal on either surface of the anode-solid electrolyte sub-assembly manufactured according to Example 1, Comparative Example 1, and Comparative Example 2;

Figure 7A:
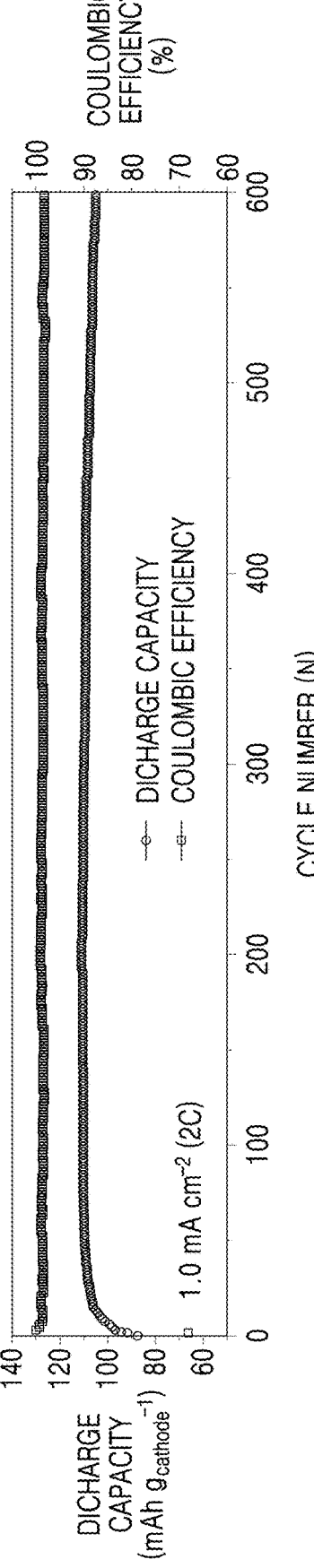
Figure 7B:
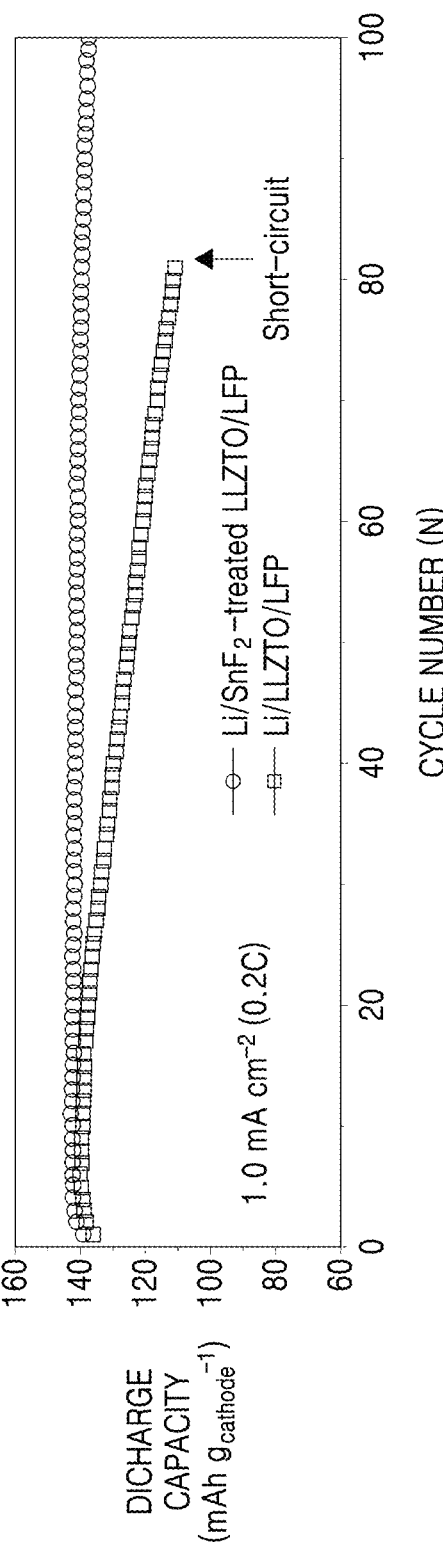
Figure 7C:
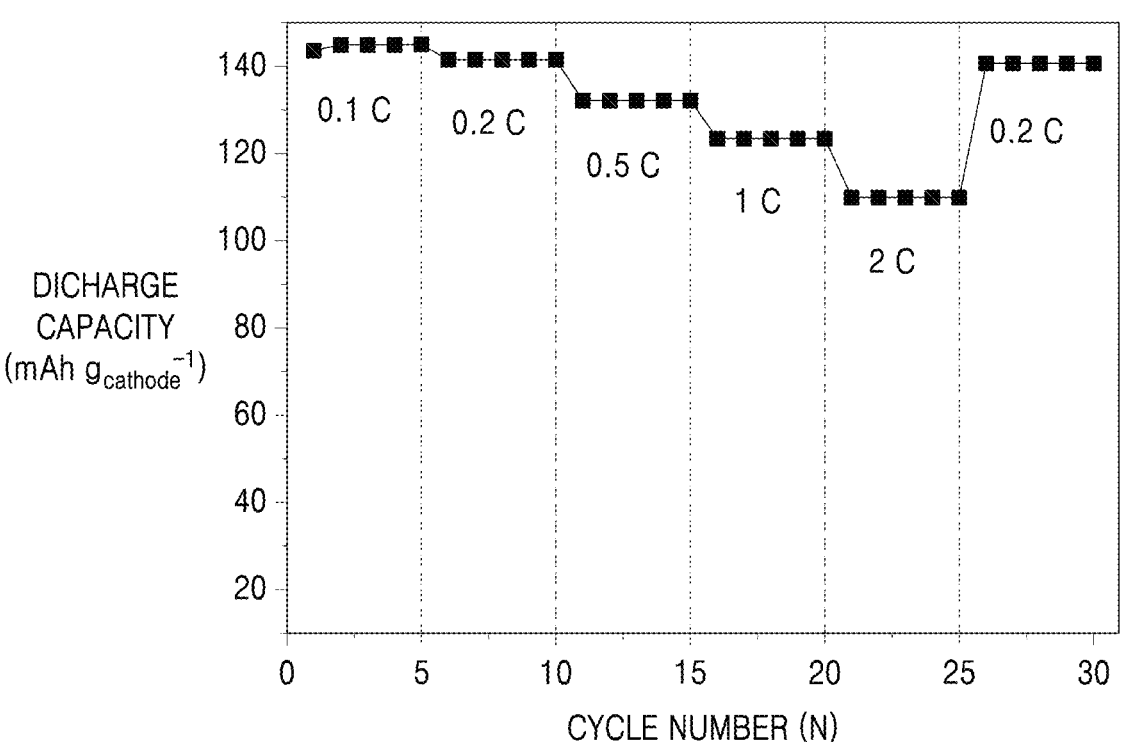
Figure 7D:
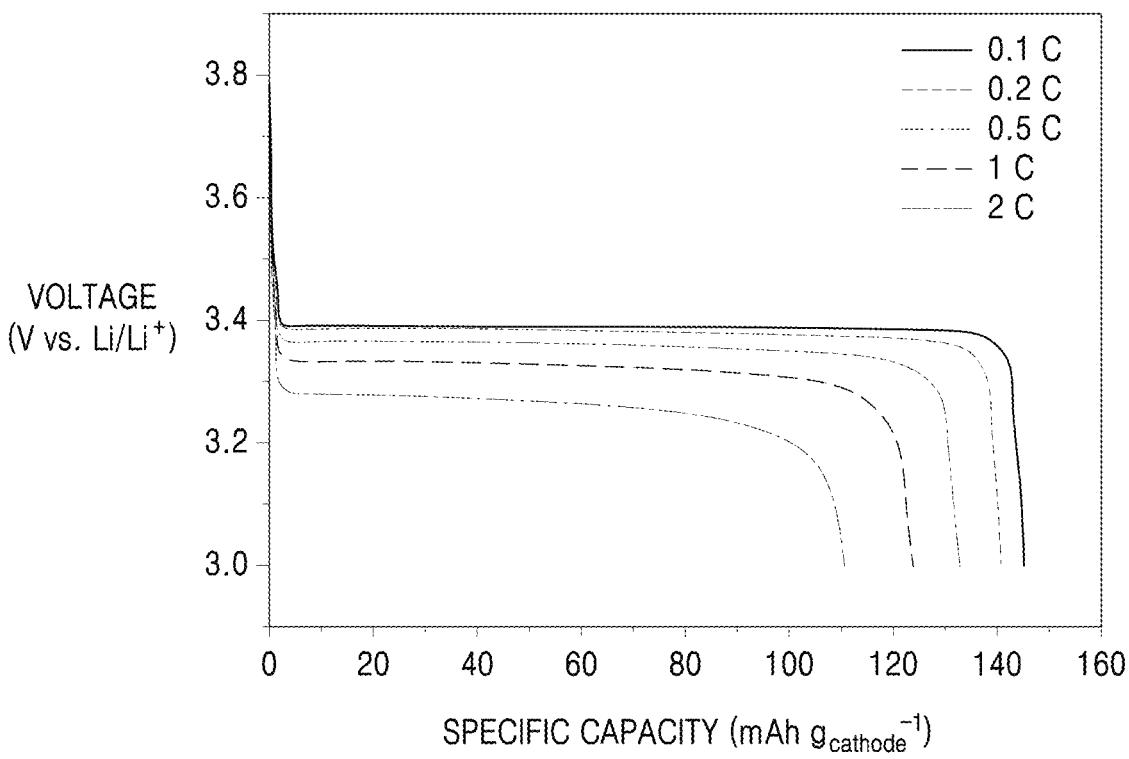
Figures 8A, 8B, 8C:
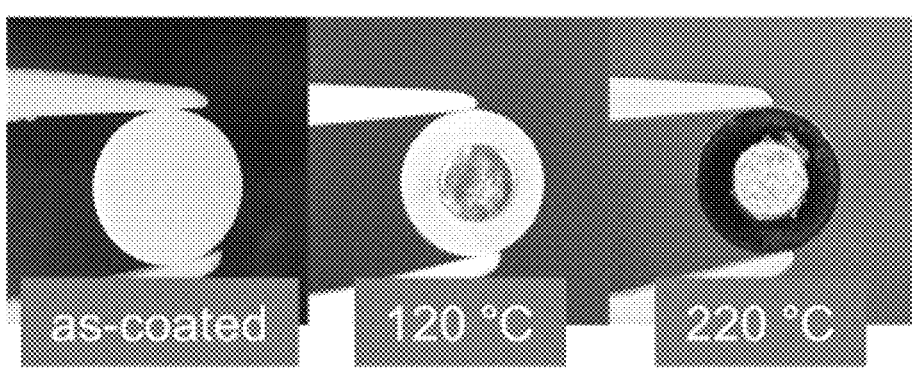
Figure 9:
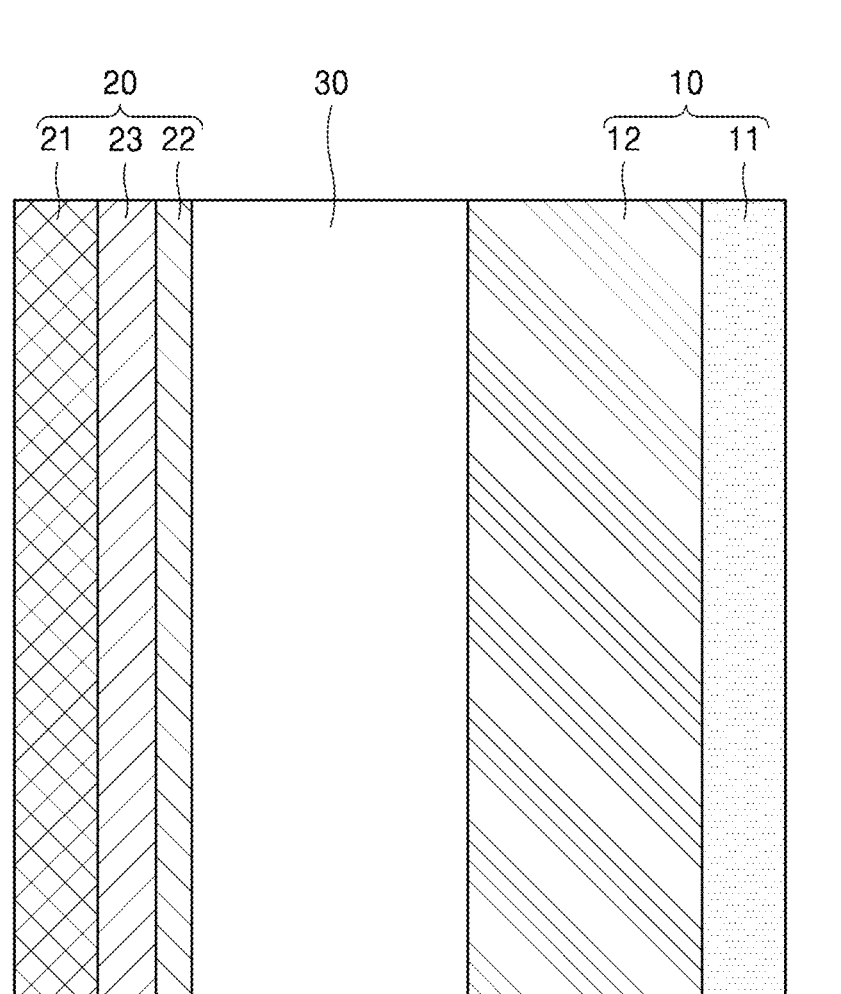
Figure 10:
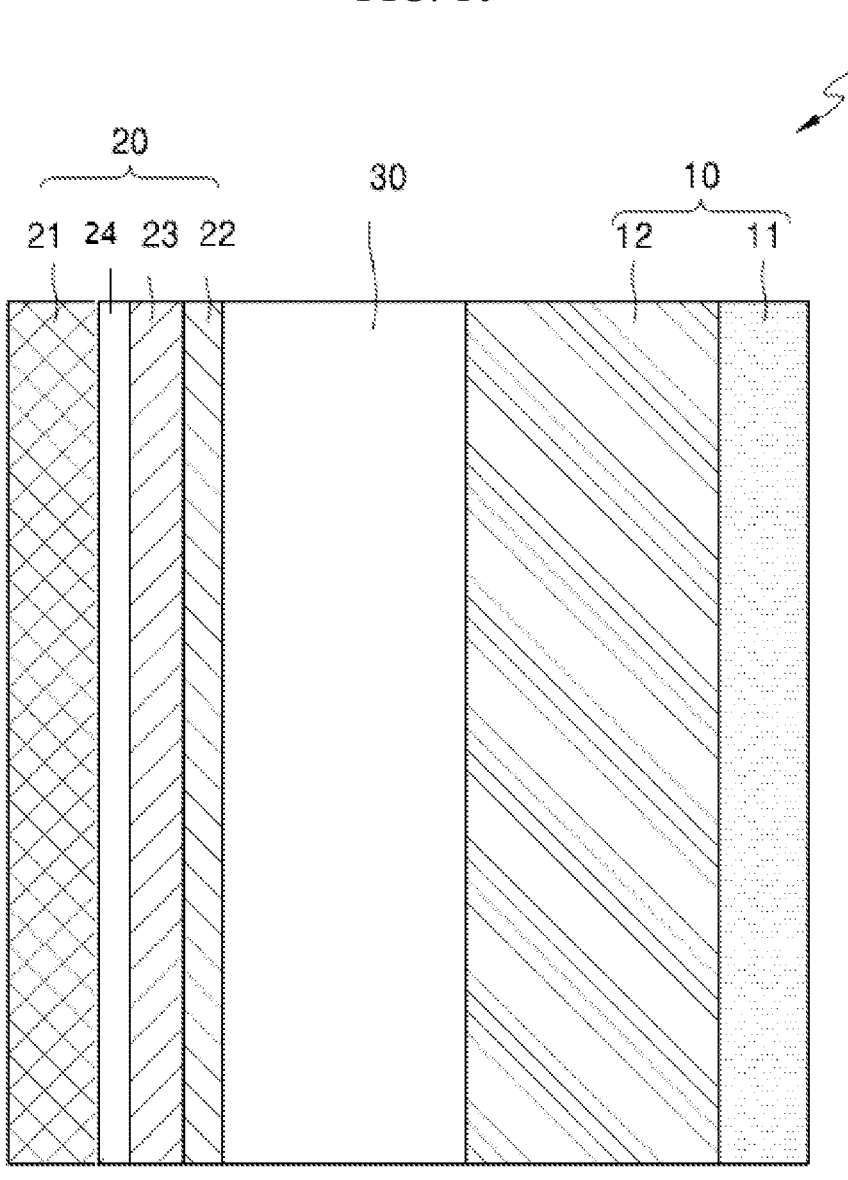

FIG. 7A is a graph of discharge capacity (mAhg$_{cathode}$$^{-1}$) vs. cycle number (n) illustrating results of long-term performance of a Li/SnF$_2$-treated LLZTO/LiFePO$_4$ full cell;

FIG. 7B is a graph of discharge capacity (mAhg$_{cathode}$$^{-1}$) vs. cycle number (n) comparatively illustrating results of the possibility of cycling of the batteries having an uncoated LLZTO and the SnF$_2$-treated LLZTO;

FIG. 7C is a graph of discharge capacity (mAhg$_{cathode}$$^{-1}$) vs. cycle number (n) illustrating results of rate performance of the full cell of Example 1 according to different current densities;

FIG. 7D is a graph of voltage (Volts vs. Li/Li$^+$) vs. specific capacity (mAhg$_{cathode}$$^{-1}$) illustrating a profile of voltages according to different rates in the full cell of Example 1;

FIGS. 8A-8C illustrate images of the SnF$_2$-treated LLZTO of Example 1 when reacted with lithium metal at different temperatures (as-coated, 120° C., and 220° C.);

FIG. 9 is a schematic view of an embodiment illustrating a structure of an all-solid secondary battery; and FIG. 10 is a schematic view of an embodiment illustrating a structure of an all-solid secondary battery.

DETAILED DESCRIPTION

Reference will now be made in detail to embodiments, examples of which are illustrated in the accompanying drawings, wherein like reference numerals refer to like elements throughout the specification. In this regard, the present embodiments may have different forms and should not be construed as being limited to the descriptions set forth herein. Accordingly, the embodiments are merely described below, by referring to the figures, to explain various aspects. These embodiments are provided so that this disclosure will be thorough and complete, and will fully convey the scope of the invention to those skilled in the art. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of an anode-solid electrolyte sub-assembly for an all-solid secondary battery, an all-solid secondary battery including the anode-solid electrolyte sub-assembly, and a method of manufacturing the all-solid secondary battery will be described in detail with reference to the attached drawings.

There has been suggested a method of forming a metal active material layer for stable interface formation between a solid electrolyte layer and an anode current collector in an all-solid state secondary battery. However, the formation of a metal active material may cause non-uniform deposition of lithium metal on the solid electrolyte surface during charging of the battery, and cause lithium dendrites to grow, leading to cracks of the solid electrolyte and poor interfacial characteristics of the lithium metal and the solid electrolyte. While not wanting to be bound by theory, it is understood that a crack of the solid electrolyte may cause a short circuit of the all-solid state secondary battery, and degradation in lifetime and rate capability.

To provide an all-solid secondary battery that prevents a solid electrolyte from cracking and also reduces an interfacial resistance between the anode and the solid electrolyte, an all-solid secondary battery has been proposed. In the all-solid secondary battery, an anode includes: a lithium metal layer in contact with an anode current collector; an anode active material layer on the lithium metal layer; and a contact layer which is formed between the anode active material layer and a solid electrolyte wherein the contact layer includes a lithium metal.

However, in such an all-solid secondary battery, since the contact layer in contact with the solid electrolyte consists of metal only that may be absorbed into lithium during charge and discharge of the battery, the lifetime of the battery may be reduced, or the flow of electrons is not controllable, causing a short circuit of the battery. In addition, it can be difficult to control the composition of the anode, so that the reduction potential of the anode may be unstable.

To address these and other problems described above, provided is an anode for an all-solid secondary battery. The anode is on a solid electrolyte, and thus maybe referred to as an anode-solid electrolyte sub-assembly. The anode comprises an anode current collector; an anode material layer on the anode current collector; and a solid electrolyte on the anode material layer and opposite the current collector, wherein the anode material layer comprises: an interlayer, which contacts the solid electrolyte and comprises a composite comprising a first metal (M1) material of having a particle size of about 0.1 nanometer (nm) to about 300 nm, and a lithium ion conductor; and a first anode active material layer on the interlayer and opposite the anode current collector, the first anode active material layer comprising a lithium metal, a lithium alloy, or a combination thereof, wherein the lithium metal or the lithium alloy have a particle size greater than the particle size of the first metal material.

The first metal (M1) material comprises a first metal (M1) that forms an alloy or a compound with lithium, a lithium-first metal (Li-M1) alloy comprising the first metal (M1) and lithium, or a combination thereof.

The first metal (M1) material may be, for example, a lithium-first metal (Li-M1) alloy of lithium metal and the first metal (M1).

The first metal (M1) of the first metal (M1) material may comprise tin (Sn), indium (In), silicon (Si), gallium (Ga), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Ce), silver (Ag), sodium (Na), potassium (K), calcium (Ca), yttrium (Y), bismuth (Bi), tantalum (Ta), hafnium (Hf), barium (Ba), vanadium (V), strontium (Sr), tellurium (Te), lanthanum (La), or a combination thereof. For example, the first metal (M1) of the first metal (M1) material may be Sn.

The lithium-second metal alloy of the first anode active material layer is represented by Li-M2, wherein the second metal M2 is a metal that forms an alloy or a compound with lithium. The second metal (M2) may comprise tin (Sn), indium (In), silicon (Si), gallium (Ga), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Ce), silver (Ag), sodium (Na), potassium (K), calcium (Ca), yttrium (Y), bismuth (Bi), tantalum (Ta), hafnium (Hf), barium (Ba), vanadium (V), strontium (Sr), tellurium (Te), lanthanum (La), or a combination thereof. The lithium-first metal (Li-M1) alloy of the interlayer may have a same composition as a composition of the lithium-second metal (Li-M2) alloy of the first anode active material layer.

The lithium-second metal alloy (Li-M2) of the first anode active material layer may have a particle size (i.e., size) of about 0.1 micrometer (μm) to about 20 μm and have a particle size greater than the particle size of the lithium-first metal alloy (Li-M1) of the first metal (M1) material of the interlayer. When the sizes of the lithium-second metal alloy (Li-M2) of the first anode active material layer and the first-metal (M1) material of the interlayer are within the aforementioned range, it is possible to manufacture an all-solid secondary battery with improved durability in which, even if lithium is released during discharge of the battery, the structure of the interlayer and the first anode active material layer may be maintained.

Figure 1:
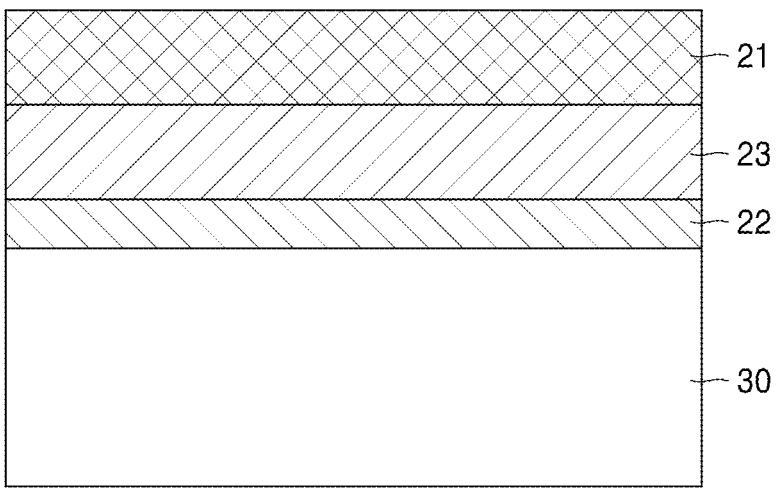
FIG. 1 is a schematic view of an embodiment illustrating a structure of an anode-solid electrolyte sub-assembly of an all-solid secondary battery.

FIG. 1 is a schematic view of an embodiment illustrating a structure of an anode-solid electrolyte sub-assembly for an all-solid secondary battery.

An interlayer 22, which includes a composite comprising a first metal (M1) active material and a lithium ion conductor, may be on a solid electrolyte 30, and a first anode active material layer 23 may be between the interlayer 22 and a negative electrode current collector 21. The anode material layer comprises the interlayer 22 and the first anode active material layer 23.

The interlayer 22, which is a layer that may improve durability and at the same time improve contact between the solid electrolyte and the anode, may reduce interfacial resistance between the solid electrolyte and the first anode active material layer 23. The lithium ion conductor may serve as a matrix for maintaining the structure of the interlayer 22.

The term "matrix" as used herein refers to a continuous phase formed by a lithium ion conductor. The composite may have a structure in which the metal (M1) active material is dispersed in a matrix of the lithium ion conductor. In other words, the composite in the composite is in a continuous phase and the metal (M1) active material is in a discontinuous phase in the matrix.

The first metal (M1) material included in the interlayer 22 may be a first metal (M1), a lithium-first metal (Li-M1) alloy, or a combination thereof, the first metal (M1) being tin (Sn), indium (In), silicon (Si), gallium (Ga), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Ce), silver (Ag), sodium (Na), potassium (K), calcium (Ca), yttrium (Y), bismuth (Bi), tantalum (Ta), hafnium (Hf), barium (Ba), vanadium (V), strontium (Sr), tellurium (Te), lanthanum (La), or a combination thereof.

The first metal (M1) material may be a lithium-first metal (Li-M1) alloy, and may be for example, a Li—Ag alloy, a Li—Au alloy, a Li—Al alloy, a Li—Sn alloy, a Li—In alloy, a Li—Zn alloy, a Li—Ge alloy, a Li—Si alloy, a Li—Sb alloy, a Li—Bi alloy, a Li—Ga alloy, a Li—Na alloy, a Li—K alloy, a Li—Te alloy, a Li—Mg alloy, a Li—Mo alloy, a Li—Sn—Bi alloy, a Li—Sn—Ag alloy, a Li—Sn—Na alloy, a Li—Sn—K alloy, a Li—Sn—Ca alloy, a Li—Te—Ag alloy, a Li—Sb—Ag alloy, a Li—Sn—Sb alloy, a Li—Sn—V alloy, a Li—Sn—Ni alloy, a Li—Sn—Cu alloy, a Li—Sn—Zn alloy, a Li—Sn—Ga alloy, a Li—Sn—Ge alloy, a Li—Sn—Sr alloy, a Li—Sn—Y alloy, a Li—Sn—Ba alloy, a Li—Sn—Au alloy, a Li—Sn—La alloy, a Li—Al—Ga alloy, a Li—Mg—Sn alloy, a Li—Mg—Al alloy, a Li—Mg—Si alloy, a Li—Mg—Zn alloy, a Li—Mg—Ga alloy, a Li—Mg—Ag alloy, or a combination thereof.

The first metal (M1) material may be a lithium-first metal (Li-M1) alloy), and may be, for example, $Li_xSn$ (wherein $0<x<5$), $Li_xZn$ (wherein $0<x<5$), $Li_xAl$ (wherein $0<x<5$), $Li_xSb$ (wherein $0<x<4$), $Li_xSi$ (wherein $0<x<5$), $Li_xAu$ (wherein $0<x<5$), $Li_xAg$ (wherein $0<x<10$), $Li_xIn$ (wherein $0<x<5$), $Li_xBi$ (wherein $0<x<5$), $Li_xGa$ (wherein $0<x<5$), $Li_xTe$ (wherein $0<x<5$), $Li_xGe$ (wherein $0<x<5$), $Li_xMg$ (wherein $0<x<7$), or a combination thereof.

$Li_xSn$ (wherein $0<x<5$) may be, for example, $Li_4Sn$, or $Li_{4.4}Sn$, and $Li_xSi$ (wherein $0<x<5$) may be, for example, $Li_4Si$, or $Li_{4.4}Si$. In addition, $Li_xAg$ (wherein $0<x<10$) may be, for example, $Li_3Ag$, $Li_{10}Ag_3$, or $Li_xAg$, and $Li_xBi$ (wherein $0<x<5$) may be, for example, $Li_3Bi$, or LiBi.

$Li_xTe$ (wherein $0<x<5$) may be, for example, $Li_2Te$, or $Li_3Te$; $Li_xGe$ (wherein $0<x<5$) may be, for example, $Li_{15}Ge_4$ ($Li_{3.75}Ge$), or $Li_9Ge_4$($Li_{2.25}Ge$); $Li_xAl$ (wherein $0<x<4$) may be, for example, $Li_3Al$, and $Li_xSb$ (wherein $0<x<4$) may be, for example, $Li_3Sb$.

The lithium ion conductor may be, for example, LiCl, LiBr, LiI, LiF, lithium oxide, lithium nitride ($Li_3N$), lithium nitrate ($LiNO_3$), $Li(ClO_4)$, or a combination thereof. The lithium oxide may be $Li_2O$, $Li_2O_2$, or a combination thereof.

A content of the first metal (M1) material in the composite may be about 0.1 part to about 95 parts by weight, about 1 part to about 95 parts by weight, about 5 parts to about 90 parts by weight, about 10 parts to about 85 parts by weight, or about 15 parts to about 70 parts by weight, based on 100 parts by weight of the composite.

In an embodiment, the composite may comprise the first metal (M1) material dispersed in a matrix of the lithium ion conductor. The lithium ion conductor may serve as a matrix to suppress migration of the metal material and a shape change. It may be confirmed that the composite differs from a simple mixture or compound of a lithium ion conductor and a metal material, a compound having a core-shell structure, by the results of a scanning electron microscopy (SEM) analysis, or a transmission electron microscopy (TEM) analysis.

As compared to a case of having a core/shell structure and a case of a simple mixture of a lithium ion conductor and a first metal material, the composite according to an embodiment may prevent metal components from being unable to play their own role, due to volumetric expansion or aggregation caused by reaction of the metal components with lithium or dissolution of lithium metal during repeated charging and discharging.

For example, the matrix of the lithium ion conductor may include LiF, and the first metal (M1) material, which is a lithium-first metal (Li-M1) alloy, may include, for example, $Li_xSn$ (wherein $0<x<5$), and have a particle size of about 0.1 μm to about 20 μm.

In an embodiment, the composite may be a composite including, for example, $Li_xSn$ (wherein $0<x<5$) and LiF. In addition, the first metal (M1) material in the interlayer, for example, a lithium-first metal (Li-M1) alloy, may have a size of about 0.1 nm to about 300 nm. When the size of the first metal (M1) material is within the range, it is possible to manufacture an all-solid secondary battery with improved durability in which the structure of the interlayer can be maintained even if lithium is released during discharge of the battery.

The lithium-second metal (Li-M2) alloy in the first anode active material layer may comprise, for example, a Li—Ag alloy, a Li—Au alloy, a Li—Al alloy, a Li—Sn alloy, a Li—In alloy, a Li—Zn alloy, a Li—Ge alloy, a Li—Si alloy, a Li—Sb alloy, a Li—Bi alloy, a Li—Ga alloy, a Li—Na alloy, a Li—K alloy, a Li—Te alloy, a Li—Mg alloy, a Li—Mo alloy, a Li—Sn—Bi alloy, a Li—Sn—Ag alloy, a Li—Sn—Na alloy, a Li—Sn—K alloy, a Li—Sn—Ca alloy, a Li—Te—Ag alloy, a Li—Sb—Ag alloy, a Li—Sn—Sb alloy, a Li—Sn—V alloy, a Li—Sn—Ni alloy, a Li—Sn—Cu alloy, a Li—Sn—Zn alloy, a Li—Sn—Ga alloy, a Li—Sn—Ge alloy, a Li—Sn—Sr alloy, a Li—Sn—Y alloy, a Li—Sn—Ba alloy, a Li—Sn—Au alloy, a Li—Sn—La alloy, a Li—Al—Ga alloy, a Li—Mg—Sn alloy, a Li—Mg—Al alloy, a Li—Mg—Si alloy, a Li—Mg—Zn alloy, a Li—Mg—Ga alloy, a Li—Mg—Ag alloy, or a combination thereof.

The lithium-second metal (Li-M2) alloy may be, for example, $Li_xSn$ (wherein $0<x<5$), $Li_xZn$ (wherein $0<x<5$), $Li_xAl$ (wherein $0<x<5$), $Li_xSb$ (wherein $0<x<4$), $Li_xSi$ (wherein $0<x<5$), $Li_xAu$ (wherein $0<x<5$), $Li_xAg$ (wherein $0<x<10$), $Li_xIn$ (wherein $0<x<5$), $Li_xBi$ (wherein $0<x<5$), $Li_xGa$ (wherein $0<x<5$), $Li_xTe$ (wherein $0<x<5$), $Li_xGe$ (wherein $0<x<5$), $Li_xMg$ (wherein $0<x<7$), or a combination thereof. Examples of $Li_xSn$ (wherein $0<x<5$), $Li_xSi$ (wherein $0<x<5$), $Li_xAg$ (wherein $0<x<10$), $Li_xBi$ (wherein $0<x<5$), $Li_xTe$ (wherein $0<x<5$), $Li_xGe$ (wherein $0<x<5$), $Li_xAl$ (wherein $0<x<4$), and $Li_xSb$ (wherein $0<x<4$) are the same as the above-described examples of the lithium-first metal (Li-M1) alloy in the interlayer.

The lithium-second metal (Li-M2) alloy in the first anode active material layer may have a structure in which the lithium alloy is distributed in a lithium metal. The lithium-second metal (Li-M2) alloy in the first anode active material layer may have a same composition as that of the lithium-first metal (Li-M1) alloy of the interlayer.

The first anode active material layer may be a mixed body of the lithium-second metal (Li-M2) alloy and the lithium metal. As used herein, the mixed body indicates a physically mixed state of a lithium alloy and a lithium metal, and the composite indicates a composite structure of a lithium alloy and a lithium metal.

The lithium-second metal (Li-M2) alloy in the first anode active material layer may have a size of about 0.1 μm to about 20 μm. When the size of the lithium-second metal (Li-M2) alloy in the first anode active material layer is within this range, it is possible to manufacture an all-solid secondary battery with improved durability, in which the structure of the first anode active material layer is maintained even if lithium is released during charge of the battery.

A content of the lithium-second metal (Li-M2) alloy in the first anode active material layer may be about 0.1 part to about 95 parts by weight, about 1 part to about 95 parts by weight, about 5 parts to about 90 parts by weight, about 10 parts to about 90 parts by weight, about 10 parts to about 85 parts by weight, or about 15 parts to about 70 parts by weight, based on 100 parts by weight of a total weight of the first anode active material layer. When the content of the lithium-second metal (Li-M2) alloy in the first anode active material layer is within these ranges, a lithium secondary battery with improved lifetime characteristics and high-rate capability may be manufactured.

In an embodiment, the interlayer may include LiF, and $Li_xSn$ (wherein $0<x<5$) of a nanosize (e.g., a particle size of about 0.1 nm to about 300 nm), and the first anode active material layer may include a lithium metal, and $Li_ySn$ (wherein $0<y<5$) of a microsize (e.g., a particle size of about 0.1 μm to about 20 μm).

The "size (i.e., particle size)" as used herein indicates a particle diameter when particles to be measured are spherical or indicates a major-axis length when particles to be measured are non-spherical. The particle diameter may be, for example, an average particle diameter, and the major-axis length may be, for example, an average major-axis length. The average particle diameter and the average major-axis length may respectively be an average value of measured particle diameters and measured major-axis lengths.

The size of a particle may be evaluated using a scanning electron microscopy (SEM) analysis or a transmission electron microscopy (TEM) analysis.

The average particle diameter may be, for example, an average particle diameter observed with a SEM analysis, and may be calculated as an average value of the particle diameters of 10 to 30 particles, using SEM images.

For example, a size of the first metal (M1) material in the composite may be about 0.1 nm to about 300 nm, about 1 nm to about 100 nm, about 3 nm to about 80 nm, or about 5 nm to about 65 nm. When the size of the first metal (M1) material is within these ranges, interfacial resistance between the solid electrolyte and the anode may be reduced.

A thickness of the interlayer may be about 5 μm or less, about 1 μm or less, about 500 nm or less, about 5 nm to about 300 nm, about 10 nm to about 500 nm, or about 20 nm to about 500 nm. When the thickness of the interlayer is within these ranges, an interfacial resistance between the first anode active material layer and the solid electrolyte may be effectively reduced without cracking in the solid electrolyte, while blocking current leakage into the solid electrolyte.

A size of the lithium-second metal (Li-M2) alloy in the first anode active material layer may be about 0.1 μm to about 20 μm, about 0.1 μm to about 18 μm, or about 0.2 μm to about 10 μm. When the size of the lithium-second metal (Li-M2) alloy is within these ranges, no void is formed during stripping of high current, and the structure is maintained, so that interfacial stability may be improved.

A thickness of the first anode active material layer may be about 1 μm to about 100 μm, about 1 μm to about 20 μm, or about 3 μm to about 20 μm. As used herein, when the thickness of each layer is defined, the thickness is defined as an average thickness, e.g., calculated based on the average thicknesses at about 10 locations to about 1000 locations, or about 50 locations to about 500 locations.

In an embodiment, a thickness ratio of the interlayer and the first anode active material layer in the anode may be about 1:100 to about 3:100 or about 1.5:100 to about 2.5:100. When the thickness ratio is within these ranges, an all-solid secondary battery with improved lifetime characteristics and high-rate capability may be manufactured.

An interfacial resistance between the interlayer and the solid electrolyte may be as small as, for example, about 500 ohms-square centimeter (ohm cm²) or less, about 200 ohm cm² or less, or about 50 ohm cm² or less.

The interfacial resistance of the interlayer with the solid electrolyte may be less than the interfacial resistance between the first anode active material layer and the solid electrolyte. For example, the interfacial resistance between the interlayer and the solid electrolyte may be less by about ⅓ than the interfacial resistance between the first anode active material layer and the solid electrolyte. For example, assuming that the interfacial resistance between the first anode active material layer and the solid electrolyte when in direct contact with each other is greater than about 180 ohm cm², the contact resistance between the interlayer and the solid electrolyte when in direct contact with each other may be less than about 60 ohm cm².

The interlayer may contain metal to induce rapid diffusion of lithium ions introduced through the solid electrolyte 30 during a charge process. Accordingly, even when a surface of the solid electrolyte 30 is irregular, and lithium ions are locally concentrated and introduced, the lithium ions may be evenly distributed throughout the anode 20 by using rapid diffusion of the lithium ions through the interlayer 22.

The interlayer includes an ionic conductor or electronic insulator to prevent flowing of electrons through the solid electrolyte 30 during a charge and discharge process. Accordingly, a charge and discharge efficiency of the battery can be increased, and the lithium metal anode penetrating through the solid electrolyte 30 to cause a short circuit of the battery may be prevented.

FIG. 9 is a schematic view explaining an embodiment of an all-solid secondary battery 1.

The all-solid secondary battery 1 may be a secondary battery including a solid electrolyte as an electrolyte.

The all-solid secondary battery 1 comprises a cathode 10, a solid electrolyte 30, and an anode 20.

Cathode

The cathode 10 may include a cathode current collector 11 and a cathode active material layer 12.

The cathode current collector 11 may be, for example, a plate or foil including indium (In), copper (Cu), magnesium (Mg), stainless steel, titanium (Ti), iron (Fe) cobalt (Co), nickel (Ni), zinc (Zn), aluminum (Al), germanium (Ge), lithium (Li), or an alloy thereof.

The cathode active material layer 12 may include, for example, a cathode active material.

The cathode active material is a material that ensures reversible intercalation and deintercalation of lithium ions. For example, the cathode active material may be a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate; nickel sulfide; copper sulfide; lithium sulfide; iron oxide; vanadium oxide, or a combination thereof. However, embodiments are not limited thereto, and any suitable anode active material in the art may be used.

The lithium transition metal oxide may be, for example, a compound represented by at least one of the following formula: $Li_aA_{1-b}B'_bD_2$ (wherein $0.9\leq a\leq1$, and $0\leq b\leq0.5$); $Li_aE_{1-b}B'_bO_{2-c}D_c$ (wherein $0.9\leq a\leq1$, $0\leq b\leq0.5$, and $0\leq c\leq0.05$); $LiE_{2-b}B'_bO_{4-c}D_c$ (wherein $0\leq b\leq0.5$ and $0\leq c\leq0.05$); $Li_aNi_{1-b-c}Co_bB'_cD_\alpha$ (wherein $0.9\leq a\leq1$, $0\leq b\leq0.5$, $0\leq c\leq0.05$, and $0<\alpha\leq2$); $Li_aNi_{1-b-c}Co_bB'_cO_{2-\alpha}F_\alpha$ (wherein $0.9\leq a\leq1$, $0\leq b\leq0.5$, $0\leq c\leq0.05$, and $0<\alpha<2$); $Li_aNi_{1-b-c}Co_bB'_cO_{2-\alpha}F_2$ (wherein $0.9\leq a\leq1$, $0\leq b\leq0.5$, $0\leq c\leq0.05$, and $0<\alpha<2$); $Li_aNi_{1-b-c}Mn_bB'_cD_\alpha$ (wherein $0.9\leq a\leq1$, $0\leq b\leq0.5$, $0\leq c\leq0.05$, and $0<\alpha\leq2$); $Li_aNi_{1-b-c}Mn_bB'_cO_{2-\alpha}F_\alpha$ (wherein $0.9\leq a\leq1$, $0\leq b\leq0.5$, $0\leq c\leq0.05$, and $0<\alpha<2$); $Li_aNi_{1-b-c}Mn_bB'_cO_{2-\alpha}F_2$ (wherein $0.9\leq a\leq1$, $0\leq b\leq0.5$, $0\leq c\leq0.05$, and $0<a<2$); $Li_aNi_bE_cG_dO_2$ (wherein $0.9\le a\le 1$, $0\le b\le 0.9$, $0\le c\le 0.5$, and $0.001\le d\le 0.1$); $Li_aNi_bCo_cMn_dGeO_2$ (wherein $0.9\le a\le 1$, $0\le b\le 0.9$, $0\le c\le 0.5$, $0\le d\le 0.5$, and $0.001\le e\le 0.1$); $Li_aNiG_bO_2$ (wherein $0.9\le a\le 1$ and $0.001\le b\le 0.1$); $Li_aCoG_bO_2$ (wherein $0.9\le a\le 1$ and $0.001\le b\le 0.1$); and $Li_aMnG_bO_2$ (wherein $0.9\le a\le 1$ and $0.001\le b\le 0.1$); $Li_aMn_2GbO_4$ (wherein $0.9\le a\le 1$ and $0.001\le b\le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0\le f\le 2$); $Li_{(3-f)}Fe_2(PO_4)_3$ (wherein $0\le f\le 2$); and $LiFePO_4$. In these compounds, A may comprise nickel (Ni), cobalt (Co), manganese (Mn), or a combination thereof; B' may comprise aluminum (Al), nickel (Ni), cobalt (Co), manganese (Mn), chromium (Cr), iron (Fe), magnesium (Mg), strontium (Sr), vanadium (V), a rare earth element, or a combination thereof; D may comprise oxygen (O), fluorine (F), sulfur (S), phosphorus (P), or a combination thereof; E may comprise cobalt (Co), manganese (Mn), or a combination thereof; F' may comprise fluorine (F), sulfur (S), phosphorous (P), or a combination thereof; G may comprise aluminum (Al), chromium (Cr), manganese (Mn), iron (Fe), magnesium (Mg), lanthanum (La), cerium (Ce), strontium (Sr), vanadium (V), or a combination thereof; Q may comprise titanium (Ti), molybdenum (Mo), manganese (Mn), or a combination thereof; I' may comprise chromium (Cr), vanadium (V), iron (Fe), scandium (Sc), yttrium (Y), or a combination thereof; and J may comprise vanadium (V), chromium (Cr), manganese (Mn), cobalt (Co), nickel (Ni), copper (Cu), or a combination thereof. A compound having a coating layer added to the surface of these compounds, or a mixture of any of the above-listed compounds and a compound having a coating layer added thereto may be used. The coating layer added to the surface of these compounds may include, for example, a coating element compound, such as an oxide of a coating element, a hydroxide of a coating element, an oxyhydroxide of a coating element, an oxycarbonate of a coating element, or a hydroxycarbonate of a coating element. These compounds of the coating layer may be amorphous or crystalline. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. A method of forming the coating layer may be selected within a range that does not adversely affect the physical properties of the cathode active material. The coating method may be, for example, spray coating, or a dipping method. A detailed description of the coating method is omitted herein because the method is easily understood by one of ordinary skill in the art.

The cathode active material may include, for example, a lithium salt of a transition metal oxide having a layered rock salt type structure, among the lithium transition metal oxides described above. The term "layered rock salt type structure" as used herein refers to a structure in which an oxygen atom layer and a metal atom layer are alternately and regularly arranged in <111> direction of a cubic rock salt type structure, and thus each atom layer forms a two-dimensional plane. The term "cubic rock salt type structure" as used herein refers to a NaCl type structure as a kind of crystal structure in which face-centered cubic lattices respectively formed of anions and cations are shifted by only a half of the ridge of each unit lattice. Examples of the lithium transition metal oxide having the layered rock salt type structure may be a ternary lithium transition metal oxide represented by $LiNi_xCo_yAl_zO_2$ (NCA) or $LiNi_xCo_yMn_zO_2$ (NCM, wherein $0<x<1$, $0<y<1$, $0<z<1$, and $x+y+z=1$). When the cathode active material includes the ternary lithium transition metal oxide having the layered rock salt type structure, the all-solid secondary battery 1 may have further improved energy density and thermal stability.

The cathode active material may be covered by a coating layer as described above. The covering layer may be any suitable covering layer known as a covering layer of a cathode active material of the all-solid secondary battery 1. The covering layer may be, for example, $Li_2O$—$ZrO_2$.

For example, when the cathode active material includes nickel (Ni) as a ternary lithium transition metal oxide such as NCA or NCM, the capacity density of the all-solid secondary battery 1 may be increased, so that metal elution from the positive active material in a charged state may be reduced. Consequently, the all-solid secondary battery 1 may have improved cycle characteristics in a charged state.

The cathode active material may be, for example, in a particle form, such as a spherical form or an elliptical form. A particle diameter of the cathode active material is not particularly limited. The diameter may be within a range applicable to a cathode active material of an all-solid secondary battery of the related art. A content of the cathode active material of the cathode 10 is not particularly limited, and may be within a range applicable to a cathode active layer of an all-solid secondary battery of the related art.

The cathode 10 may further include, in addition to a cathode active material as described above, an additive, for example, a conductive material, a binder, a filler, a dispersing agent, or an ion-conductive auxiliary agent. Examples of the conductive material include graphite, carbon black, acetylene black, Ketjen black, carbon fibers, or metal powder. Examples of the binder include styrene butadiene rubber (SBR), polytetrafluoroethylene, polyvinylidene fluoride, or polyethylene. The dispersing agent, the ion-conductive auxiliary agent, or a coating agent, which may be added to the cathode 10 may be any suitable materials used in the cathode of an all-solid secondary battery.

The cathode 10 may further include a solid electrolyte. The solid electrolyte included in the cathode 10 may be similar with or different from the solid electrolyte 30. As a detailed description of the solid electrolyte of the cathode 10, the detailed description of the solid electrolyte 30 provided above may be referred to. Repeated aspects, which can be determined by one of skill in the art without undue experimentation, are omitted for clarity.

The solid electrolyte included in the cathode 10 may be, for example, a sulfide-based (i.e., sulfide) solid electrolyte. The sulfide-based solid electrolyte may be the sulfide-based solid electrolyte used in the solid electrolyte 30.

In another embodiment, the cathode 10 may be, for example, soaked with a liquid electrolyte. The liquid electrolyte may include a lithium salt and an ionic liquid, a polymeric ionic liquid, or a combination thereof. The liquid electrolyte may be non-volatile. The ionic liquid refers to a salt in a liquid state at room temperature (25° C.) or a room-temperature molten salt, having a melting point equal to or below the room temperature (25° C.) and consisting of ions. The ionic liquid may be compounds comprising at least one of a) a cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, and a combination thereof; orb) an anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof. The ionic liquid may be, for example, comprising N-methyl-N-propylpyrrolidium bis(trifluoromethylsulfonyl)imide, N-butyl-N-methylpyrrolidium bis(3-trifluoromethylsulfonyl)imide, 1-butyl-3-methylimidazolium bis(trifluoromethylsulfonyl)imide, 1-butyl-3-methylimidazolium bis(trifluoromethylsulfonyl) imide), or a combination thereof. The polymeric ionic liquid may include a repeating unit including: a) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) at least one anion of $BF_4^-$, $PF_6^-$, $AsF_5^-$, $SbF_5^-$, $AlCl_4$, $HSO_4$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4$ $PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $CF_3SO_2)_2CH^-$, $(SF_5)_3C^-$, $(O(CF_3)_2C_2(CF_3)_2O)_2PO^-$, or a combination thereof.

The lithium salt may be any suitable lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each be a natural number), $LiCl$, $LiI$, or a mixture thereof. A concentration of the lithium salt in the liquid electrolyte may be about 0.1 molar (M) to about 5M. A content of the liquid electrolyte impregnated in the cathode 10 may be about 0 part to about 100 parts by weight, about 0 part to about 50 parts by weight, about 0 part to about 30 parts by weight, about 0 part to about 20 parts by weight, about 0 part to about 10 parts by weight, or about 0 part to about 5 parts by weight, with respect to 100 parts by weight of the cathode active material layer 12 including no liquid electrolyte.

Solid Electrolyte

The solid electrolyte 30 may be between the cathode 10 and the anode 20. The solid electrolyte 30 may include a solid electrolyte.

The solid electrolyte may be an oxide-based (i.e., oxide) solid electrolyte, a sulfide-based (i.e., sulfide) solid electrolyte, or a combination thereof. The solid electrolyte may be, for example, an oxide-based solid electrolyte. The oxide-based solid electrolyte is $Li_{1+x+y}Al_xTi_{2-x}Si_yP_{3-y}O_{12}$ (wherein $0<x<2$ and $0\leq y<3$), $Li_3PO_4$, $Li_xTi_y(PO_4)_3$ (wherein $0<x<2$ and $0<y<3$), $Li_xAl_yTi_z(PO_4)_3$ (wherein $0<x<2$, $0<y<1$, and $0<z<3$), $Li_{1+x+y}(Al_pGa_{1-p})_x(Ti_qGe_{1-q})_{2-x}Si_yP_{3-y}O_{12}$ (wherein $0\leq x\leq1$, $0\leq y\leq1$, $0\leq p\leq1$, and $0\leq q\leq1$), $Li_xLa_yTiO_3$ (wherein $0<x<2$ and $0<y<3$), $Li_2O$, $LiOH$, $Li_2CO_3$, $LiAlO_2$, $Li_2O$— $Al_2O_3$—$SiO_2$—$P_2O_5$—$TiO_2$—$GeO_2$, $Li_{3+x}La_3M_2O_{12}$ (wherein M is Te, Nb, or Zr, and x is an integer of 1 to 10), or a combination thereof. The solid electrolyte may be prepared by sintering.

The oxide-based solid electrolyte may be, for example, a garnet-type solid electrolyte. As used herein, the term "garnet" or "garnet-type" means that the compound is isostructural with garnet, e.g., $Mg_3Al_2(SiO_4)_3$.

A non-limiting example of the garnet-type solid electrolyte may be an oxide represented by Formula 1:

$$(Li_xM1_y)(M2)_{3-\delta}(M3)_{2-\omega}O_{12-z}X_z \qquad \text{Formula 1}$$

wherein, in Formula 1, $6\leq x\leq8$, $0\leq y<2$, $-0.2\leq\delta\leq0.2$, $-0.2\leq\omega\leq0.2$, and $0\leq z\leq2$, M1 may be a monovalent cation, a divalent cation, a trivalent cation, or a combination thereof, M2 may be a monovalent cation, a divalent cation, a trivalent cation, or a combination thereof, M3 may be a monovalent cation, a divalent cation, a trivalent cation, a tetravalent cation, a pentavalent cation, a hexavalent cation, or a combination thereof, and X may be a monovalent anion, a divalent anion, a trivalent anion, or a combination thereof.

In Formula 1, examples of the monovalent cation may include Na, K, Rb, Cs, H, or Fr, and examples of the divalent cation may include Mg, Ca, Ba, or Sr. Examples of the trivalent cation may include In, Sc, Cr, Au, B, Al, or Ga, and examples of the tetravalent cation may include Sn, Ti, Mn, Ir, Ru, Pd, Mo, Hf, Ge, V, or Si. Examples of the pentavalent cation may include Nb, Ta, Sb, V, or P.

In Formula 1, M1 may be, for example, hydrogen (H), iron (Fe), gallium (Ga), aluminum (Al), boron (B), beryllium (Be), or a combination thereof. M2 may be lanthanum (La), barium (Ba), calcium (Ca), strontium (Sr), yttrium (Y), bismuth (Bi), praseodymium (Pr), neodymium (Nd), actinium (Ac), samarium (Sm), gadolinium (Gd), or a combination thereof, and M3 may be zirconium (Zr), hafnium (Hf), tin (Sn), tin (Sn), niobium (Nb), titanium (Ti), vanadium (V), chromium (Cr), manganese (Mn), cobalt (Co), nickel (Ni), copper (Cu), molybdenum (Mo), tungsten (W), tantalum (Ta), magnesium (Mg), technetium (Tc), ruthenium (Ru), palladium (Pd), iridium (Ir), scandium (Sc), cadmium (Cd), indium (In), antimony (Sb), tellurium (Te), thallium (TI), platinum (Pt), silicon (Si), aluminum (Al), or a combination thereof.

In Formula 1, the monovalent anion represented by X may be a halogen, a pseudohalogen, or a combination thereof, and the divalent anion represented by X may be $S^{2-}$ or $Se^{2-}$, and the trivalent anion represented by X may be, for example, $N^{3-}$.

In Formula 1, x may be, for example, $6.6\leq x\leq8$, $6.7\leq x\leq7.5$, or $6.8\leq x\leq7.1$.

A non-limiting example of the garnet-type solid electrolyte may be an oxide represented by Formula 2:

$$(Li_xM1_y)(La_{a1}M2_{a2})_{3-\delta}(Zr_{b1}M3_{b2})_{2-\omega}O_{12-z}X_z \qquad \text{Formula 2}$$

wherein, in Formula 2,

M1 is hydrogen (H), iron (Fe), gallium (Ga), aluminum (Al), boron (B), beryllium (Be), or a combination thereof, M2 is barium (Ba), calcium (Ca), strontium (Sr), yttrium (Y), bismuth (Bi), praseodymium (Pr), neodymium (Nd), actinium (Ac), samarium (Sm), gadolinium (Gd), or a combination thereof, M3 is hafnium (Hf), tin (Sn), niobium (Nb), titanium (Ti), vanadium (V), chromium (Cr), manganese (Mn), cobalt (Co), nickel (Ni), copper (Cu), molybdenum (Mo), tungsten (W), tantalum (Ta), magnesium (Mg), technetium (Tc), ruthenium (Ru), palladium (Pd), iridium (Ir), scandium (Sc), cadmium (Cd), indium (In), antimony (Sb), tellurium (Te), thallium (TI), platinum (Pt), silicon (Si), aluminum (Al), or a combination thereof, $6 \leq x \leq 8$, $0 \leq y < 2$, $-0.2 \leq \delta \leq 0.2$, $-0.2 \leq w \leq 0.2$, and $0 \leq z \leq 2$ $a1 + a2 = 1$, $0 < a1 \leq 1$, and $0 < a2 < 1$, $b1 + b2 = 1$, $0 < b1 < 1$, and $0 \leq b2 < 1$, and X is a monovalent anion, a divalent anion, a trivalent anion, or a combination thereof.

In Formula 2, the monovalent anion represented by X may be a halogen, a pseudohalogen, or a combination thereof, and the divalent anion represented by X may be $S^{2-}$ or $Se^{2-}$, and the trivalent anion represented by X may be, for example, $N^{3-}$.

In Formula 2, x may be, for example, $6.6 \leq x \leq 8$, $6.7 \leq x \leq 7.5$, or $6.8 \leq x \leq 7.1$.

The term "pseudohalogen" as used herein refers to a molecule consisting of at least two electronegative atoms resembling halogens in a free state and generating anions similar to halide ions. Examples of pseudohalogens include cyanide, cyanate, thiocyanate, azide, or a combination thereof.

Examples of the halogen in Formula 2 may be iodine (I), chlorine (Cl), bromine (Br), fluorine (F), or a combination thereof. Examples of the pseudohalogen in Formula 2 may be cyanide, cyanate, thiocyanate, azide, or a combination thereof.

The trivalent anion may be, for example, $N^3$.

In Formula 2, M may be Al, Ga, In, Si, Ge, Sn, Sb, Bi, Sc, Y, Ti, Hf, V, Nb, Ta, W, or a combination thereof.

In an embodiment, the garnet-type solid electrolyte may be an oxide represented by Formula 3:

$$Li_{3+x}La_3Zr_{2-a}M_aO_{12} \qquad \text{Formula 3}$$

wherein, in Formula 3, M may be Al, Ga, In, Si, Ge, Sn, Sb, Bi, Sc, Y, Ti, Hf, V, Nb, Ta, W, or a combination thereof, x may be a number from 1 to 10, and $0 \leq a < 2$.

The garnet-type solid electrolyte may be, for example, $Li_7La_3Zr_2O_{12}$ or $Li_{6.5}La_3Zr_{1.5}Ta_{0.5}O_{12}$.

In an embodiment, the solid electrolyte may be, for example, a sulfide-based solid electrolyte. The sulfide-based solid electrolyte may be, for example, $Li_2S$—$P_2S_5$, $Li_2S$—$P_2S_5$—LiX (wherein X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are each independently a positive number, and Z is Ge, Zn, Ga, or a combination thereof), $Li_2S$—$GeS_2$, $Li_2S$—$SiS_2$—$Li_3PO_4$, $Li_2S$—$SiS_2$—$Li_pMO_q$ (wherein p and q are each independently a positive number, and M is P, Si, Ge, B, Al, Ga, In, or a combination thereof), $Li_{7-x}PS_{6-x}Cl_x$ (wherein $0 \leq x \leq 2$), $Li_{7-x}PS_{6-x}Br_x$ (wherein $0 \leq x \leq 2$), $Li_{7-x}PS_{6-x}I_x$ (wherein $0 \leq x \leq 2$), or a combination thereof. The sulfide-based solid electrolyte may be prepared using a start source material, for example, $Li_2S$, or $P_2S_5$, by melt quenching or mechanical milling. These treatments may be followed by heat treatment. The sulfide-based solid electrolyte may be amorphous, crystalline, or an amorphous and crystalline mixture.

In addition, the sulfide-based solid electrolyte may be, for example, any of the above-listed sulfide-based solid electrolyte materials including at least sulfur (S), phosphorous (P), and lithium (Li). For example, the sulfide-based solid electrolyte may be a material including $Li_2S$—$P_2S_5$. When a sulfide-based solid electrolyte including $Li_2S$—$P_2S_5$ is used, a molar ratio of $Li_2S$ to $P_2S_5$ ($Li_2S$:$P_2S_5$) may be, for example, in a range of about 50:50 to about 90:10.

The sulfide-based solid electrolyte may be a compound having an argyrodite-type crystal structure. "Argyrodite" or "argyrodite-type" as used herein means that the compound has a crystal structure isostructural with argyrodite, $Ag_8GeS_6$.

The compound having an argyrodite-type crystal structure may include, for example, $Li_{7-x}PS_{6-x}Cl_x$ (wherein $0 \leq x \leq 2$), $Li_{7-x}PS_{6-x}Br_x$ (wherein $0 \leq x \leq 2$), $Li_{7-x}PS_{6-x}I_x$ (wherein $0 \leq x \leq 2$), or a combination thereof. In particular, the sulfide-based solid electrolyte that may be included in the solid electrolyte may be an argyrodite-type compound including $Li_6PS_5Cl$, $Li_6PS_5Br$, $Li_6PS_5I$, or a combination thereof.

For example, the solid electrolyte 30 may further include a binder. For example, the binder that may be included in the solid electrolyte 30 may be styrene butadiene rubber (SBR), polytetrafluoroethylene, polyvinylidene fluoride, or polyethylene. However, embodiments are not limited thereto, and any suitable binder available in the art may be used. The binder of the solid electrolyte 30 may be the same as or different from the binder of the cathode active material layer 12 and the first anode active material layer 23.

Anode

Referring to FIG. 9, the anode 20 may include an anode current collector 21, a first anode active material layer 23, and an interlayer 22. The first anode active material layer 23 is between the anode current collector 21 and the interlayer 22, and the interlayer 22 is between the first anode active material layer 23 and the solid electrolyte 30.

For example, the anode current collector 21 may comprise a material that does not react with lithium, i.e., does not form an alloy or a compound with lithium. A material of the anode current collector 21 may be, for example, copper (Cu), stainless steel, titanium (Ti), iron (Fe), cobalt (Co), or nickel (Ni). However, embodiments are not limited thereto. Any material suitable in the art as an anode current collector may be used. The anode current collector 21 may comprise one of the above-listed metals or may comprise an alloy or a coating material of two or more of the above-listed metals. The anode current collector 21 may be, for example, in a form of a plate or a foil.

As shown in FIG. 10, in the all-solid secondary battery 1 according to one or more embodiments, a second anode active material layer 24 may be further arranged between the anode current collector 21 and the first anode active material layer 23. The interlayer 22, the first anode active material layer 23, and the second anode active material layer 24 may constitute an anode material layer.

The second anode active material layer 24 may include, for example, a third metal (M3). The third metal (M3) may be a metal that may react with lithium to form an alloy or a compound, or a metal that may not react with lithium.

The third metal (M3) may be lithium, silver (Ag), tin (Sn), indium (In), silicon (Si), gallium (Ga), aluminum (Al), titanium (Ti), zirconium (Zr), niobium (Nb), germanium (Ge), antimony (Sb), bismuth (Bi), zinc (Zn), gold (Au), platinum (Pt), palladium (Pd), nickel (Ni), iron (Fe), cobalt (Co), chromium (Cr), magnesium (Mg), cesium (Ce), lanthanum (La), tungsten (W), tellurium (Te), a lithium alloy comprising lithium and silver, tin, indium, silicon, gallium, aluminum, titanium, zirconium, niobium, germanium, antimony, bismuth, zinc, gold, platinum, palladium, nickel, iron, cobalt, chromium, magnesium, cesium, lanthanum, tungsten, tellurium, or a combination thereof.

In an embodiment, the second anode active material layer 24 may include: i) a carbonaceous anode material, or ii) a carbonaceous anode active material and a second metal (M2) or iii) a carbonaceous anode active material and a metalloid anode active material. When the second anode active material layer 24 includes a carbonaceous active material, the second anode active material may function as a buffer layer to relieve volume expansion caused by lithium intercalation and deintercalation during charge and discharge.

The second anode active material layer 24 may be added when assembling the battery.

In an embodiment, the anode current collector, the interlayer, the first anode active material layer, the second anode active material layer, or a region therebetween may be a Li-metal free region that does not include lithium metal in an initial state or in a state-after-discharge of the all-solid secondary battery.

In an embodiment, while charging and discharging the all-solid secondary battery or/and while assembling the all-solid secondary battery, lithium as a precipitate may be introduced into the interlayer and/or the first anode active material layer.

The second anode active material layer 24 may be formed as a precipitation layer while charging and discharging the all-solid secondary battery or/and while assembling the all-solid secondary battery. The second anode active material layer 24 may be a lithium metal layer or a lithium alloy layer.

When the second anode active material layer 24 comprises a third metal (M3), the third metal (M3) may form a lithium-third metal (Li-M3) alloy by a reaction with lithium precipitating through a reversible reaction during charge and discharge of the all-solid secondary battery. As a result, the second anode active material layer 24 comprises the Li-M3 alloy.

In particular, the second anode active material layer 24 may be a single metal layer of Ag or Sn, or a single lithium metal layer in an initial state, before charging (that is, before lithium is precipitated by charging).

When the second anode active material layer 24 includes a lithium alloy such as Ag—Li, the second anode active material layer 24 may be formed by forming a silver layer while assembling the battery, and then forming a lithium alloy layer such as Ag—Li through precipitation of lithium onto the silver layer while charging and discharging the all-solid secondary battery and/or while assembling the all-solid secondary battery.

A thickness of the second anode active material layer 24 may be about 20 nm to about 50 μm, about 50 nm to about 40 μm, about 100 nm to about 30 μm, or about 300 nm to about 20 μm. When the thickness of the second anode active material layer 24 is within these ranges, the all-solid secondary battery may have excellent cycle characteristics.

When the second anode active material layer 24 is formed as a single layer of the third metal (M3), such as a silver layer, while assembling a battery, the second negative active material layer may have a thickness of, for example, about 20 nm to about 1 μm, about 100 nm to about 1 μm, or about 300 nm to about 600 nm. The second anode active material layer 24 may reduce volume expansion during charge and discharge and may improve uniformity of lithium distribution.

When the second anode active material layer 24 includes a carbonaceous anode active material, the carbonaceous anode active material may include amorphous carbon. The amorphous carbon may be, for example, carbon black (CB), acetylene black (AB), furnace black (FB), Ketjen black (KB), graphene, carbon nanotubes, carbon nanofiber, or a combination thereof. However, embodiments are not limited thereto. Any material suitable as amorphous carbon in the art may be used.

The metal or metalloid anode active material may include indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof, but embodiments are not limited thereto. Any suitable metal anode active material or metalloid anode active material in the art, which can form an alloy or a compound with lithium, may be used.

The second anode active material layer 24 may include one anode active material from among a carbonaceous active material and a metal or a metalloid anode active material, or may include a mixture of a plurality of different anode active materials. For example, the second anode active material layer may include amorphous carbon only or may include a metal or metalloid of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), palladium (Pd), silver (Ag), zinc (Zn), or a combination thereof. In an embodiment, the second anode active material layer 24 may include a complex of amorphous carbon and a metal or metalloid anode active material of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), palladium (Pd), silver (Ag), zinc (Zn), or a combination thereof. A composition ratio of a composite of, for example, amorphous carbon to silver may be, by weight, for example, about 10:1 to about 1:2, about 5:1 to about 1:1, or about 4:1 to about 2:1, but embodiments are not limited thereto. The composite ratio may be selected according to required characteristics of the all-solid secondary battery. When the second anode active material layer 24 has a composition as above, the all-solid secondary battery may have further improved cycle characteristics.

The anode active material included in the second anode active material layer may include, for example, a mixture of a first particle comprising an amorphous carbon and a second particle comprising a metal or metalloid. The mixture may be a simple mixture of the first particle and the second particle or a mixture of the first particle and the second particle that are physically bound by a binder. The metal or metalloid may include, for example, indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), palladium (Pd), silver (Ag), zinc (Zn), or a combination thereof. In an embodiment, the metalloid may be a semiconductor. A content of the second particle may be about 8 weight percent (wt %) to about 60 wt %, about 10 wt % to about 50 wt %, about 15 wt % to about 40 wt %, or about 20 wt % to about 30 wt %, each based on a total weight of the mixture. When the content of the second particle is within these ranges, the all-solid secondary battery 1 may have, for example, further improved cycle characteristics.

The second anode active material layer 24 may include: i) a composite of a first particle comprising amorphous carbon and a second particle comprising a metal or metalloid; or ii) a mixture of a first particle comprising amorphous carbon and a second particle comprising a metal or metalloid. A content of the second particle may be about 1 wt % to about 60 wt %, based on a total weight of the composite or the mixture.

A thickness of the second anode active material layer 24 may be, for example, about 10 nm to about 10 μm, about 100 nm to about 10 μm, about 200 nm to about 10 μm, about 300 nm to about 10 μm, about 400 nm to about 10 μm, about 500 nm to about 10 μm, about 1 μm to about 10 μm, about 1 μm to about 9 μm, about 1 μm to about 8 μm, about 2 μm to about 7 μm, or about 3 μm to about 7 μm. When the thickness of the second anode active material layer is within these ranges, a short circuit may be suppressed, and cycle characteristics of the all-solid secondary battery may be improved.

When the second anode active material layer 24 includes a carbonaceous active material, the second anode active material layer may have a characteristic of a volume changing according to a volumetric change of the interlayer. For example, when the interlayer expands during a charging process, volume expansion of the first anode active material layer may be absorbed and reduced. When the second anode active material layer 24 includes a carbonaceous active material, voids may be included in the second anode active material layer. The second anode active material layer in a state-after-discharge may include voids created therein.

The second anode active material layer 24 may include, for example, amorphous carbon and a silicon-based (i.e., silicon) anode active material. The silicon-based anode active material may include silicon, a silicon-carbon composite, SiO$_x$ (wherein 0<x<2), a Si-Q alloy (wherein Q may be an alkali metal, an alkaline earth metal, a Group 13 element, a Group 14 element, a Group 15 element, a Group 16 element, a transition metal, a rare earth element, or a combination thereof, and Q is not Si), or a combination thereof. "Group" means a group of the Periodic Table of the Elements according to the International Union of Pure and Applied Chemistry ("IUPAC") Group 1-18 group classification system. The silicon-based anode active material may be a mixture of at least one of the above-listed materials and SiO$_2$. Q may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (TI), germanium (Ge), phosphorus (P), arsenic (As), antimony (Sb), bismuth (Bi), sulfur (S), selenium (Se), tellurium (Te), polonium (Po), or a combination thereof.

The second anode active material layer 24 may be a silicon-carbon composite including a silicon particle and a first carbonaceous material; a silicon-carbon composite including a core in which a silicon particle and a second carbonaceous material are mixed, and a third carbonaceous material surrounding the core; or a combination thereof. The first carbonaceous material to the third carbonaceous material may each independently be a crystalline carbon, an amorphous carbon, or a combination thereof. The silicon-carbon composite may include a core including a silicon particle and a crystalline carbon, and an amorphous carbon coating layer on the surface of the core.

When the silicon-carbon composite is used as a silicon-based active material, the all-solid secondary battery may have high capacity and stable cycle characteristics.

In the silicon-carbon composite including a silicon particle and a first carbonaceous material, a content of the silicon particle may be in a range of about 30 wt % to about 70 wt %, or for example, about 40 wt % to about 50 wt %. In an embodiment, the silicon-based active material may include a silicon-carbon composite including a core in which a silicon particle and a second a carbonaceous material are mixed, and a third carbonaceous material surrounding the core. When the silicon-carbon composite is used, the all-solid secondary battery may have high capacity, improved capacity retention, and in particular, improved lifespan characteristics at high temperatures.

In addition, a content of the third carbonaceous material may be about 1 wt % to about 50 wt %, and a content of the silicon particle may be about 30 wt % to about 70 wt %, each based on 100 wt % of the silicon-carbon composite. The second carbonaceous material may be included in a content of about 20 wt % to about 69 wt %. When the contents of the silicon particle, the third carbonaceous material, and the second carbonaceous material are within these ranges, the all-solid secondary battery may have excellent discharge capacity and improved capacity retention.

A diameter of the silicon particle may be about 10 nm to about 30 μm, for example, about 10 nm to about 1,000 nm, or about 20 nm to about 150 nm. When the average diameter of the silicon particles is within these ranges, volume expansion that may occur during charge and discharge may be suppressed, and interruption of electron movement due to particle breakage during charge and discharge may be prevented.

In the silicon-carbon composite, for example, the second carbonaceous material may be a crystalline carbon, and the third carbonaceous material may be an amorphous carbon. That is, the silicon-carbon composite may include a core including a silicon particle and a crystalline carbon, and an amorphous carbon coating layer on the surface of the core.

The crystalline carbon may include artificial graphite, natural graphite, or a combination thereof. The amorphous carbon may include pitch carbon, soft carbon, hard carbon, mesophase pitch carbide, sintered coke, carbon fiber, or a combination thereof. A precursor of the amorphous carbon may be coal-based pitch, mesophase pitch, petroleum-based pitch, coal-based oil, petroleum-based heavy oil, or a polymer resin such as phenol resin, furan resin, or polyimide resin.

The silicon-carbon composite may include about 10 wt % to about 60 wt % of silicon, and about 40 wt % to about 90 wt % of the carbonaceous material, each based on 100 wt % of the silicon-carbon composite. In the silicon-carbon composite, a content of the crystalline carbon may be about 10 wt % to about 70 wt %, and a content of the amorphous carbon may be about 20 wt % to about 40 wt %, each based on 100 wt % of a total weight of the silicon-carbon composite. The average diameter (D50) as used herein refers to the diameter of particles having a cumulative volume of 50 volume percent (%) in a particle size distribution.

The second anode active material layer 24 may be between the anode current collector 21 and the first anode active material layer 23, and may include a lithium metal or a lithium alloy. Examples of the lithium alloy are a Li—Ag alloy, a Li—Au alloy, a Li—Al alloy, a Li—Sn alloy, a Li—In alloy, a Li—Zn alloy, a Li—Ge alloy, or a Li—Si alloy, but embodiments are not limited thereto. The second anode active material layer 24 may be disposed when assembling a battery, or may be formed as a precipitation layer, which is not present when assembling a battery, after the battery is charged.

As described above, the second anode active material layer 24 may include a lithium metal, a lithium alloy, or a metal that does not include lithium but can form an alloy with lithium, a composite of at least two such metals, or an alloy of such a metal, or a combination thereof. Examples of the second anode active material layer 24 include Ag, Sn, a Sn—Si alloy, an Ag—Sn alloy, a combination thereof, or a combination of lithium and the foregoing metals.

For example, the interlayer 22 may not include an organic material such as a carbonaceous material or a binder. The interlayer 22 contains a composite, and thus may prevent a side reaction caused by other organic materials during charge and discharge. Since the interlayer 22 does not include a carbonaceous material, the interlayer 22 may form an interface with excellent adhesion to the solid electrolyte, compared to when including a carbonaceous material.

Since the interlayer 22 includes the first metal (M1) material, rapid diffusion of lithium ions introduced through the solid electrolyte may be induced during charge. Accordingly, when lithium ions are introduced and locally concentrated due to an irregular surface of the solid electrolyte, the lithium ions may be evenly distributed over the entirety of the anode by the rapid diffusion of the lithium ions through the interlayer 22.

The interlayer 22 may have a less amount of a metal, for example, a lithium metal or a lithium alloy, which is precipitated during charge, compared to the first anode active material layer 23.

In particular, when the solid electrolyte includes an oxide solid electrolyte, which is harder than a sulfide solid electrolyte, cracks may occur in the solid electrolyte, due to the lithium metal that is locally precipitated in the interlayer. These cracks may cause the lithium metal to penetrate into the solid electrolyte. The lithium metal penetration may cause a short circuit and reduce stability of the all-solid secondary battery.

In addition, during repeated charging and discharging, voids may be formed between the interlayer and the solid electrolyte by the lithium metal locally precipitated on the interlayer, and a contact area between the interlayer and the solid electrolyte may be reduced. This may lead to an overvoltage of the all-solid secondary battery.

However, in the all-solid secondary battery 1 according to an embodiment, an amount of lithium metal precipitated on the interlayer 22 may be minimized by inducing the metal to be precipitated on the first anode active material layer 23. Accordingly, a short circuit and an overvoltage of the all-solid secondary battery 1 may be prevented.

The first metal (M1) material of the interlayer 22 may comprise the same metal as that of the first anode active material layer, or may comprise the same metal as that of the second negative active material layer if needed.

According to an embodiment, provided is a method of manufacturing the all-solid secondary battery 1, the method including: preparing the anode 20; disposing the anode 20 on a first surface of the solid electrolyte 30; and disposing the cathode 10 on the second surface of the solid electrolyte 30.

Hereinafter, embodiments of the method of manufacturing the all-solid secondary battery will be described in greater detail.

The method of manufacturing the all-solid secondary battery comprises: providing the cathode; disposing the solid electrolyte on the cathode; and disposing an anode on the solid electrolyte opposite the cathode, wherein the disposing of the anode comprises providing a composition comprising a first metal and a halogen, e.g., a compound of the formula (M1)-X, onto a first surface of the solid electrolyte to form a first metal (M1)-X composite layer as a conformal coating layer. The first metal (M1)-X composite layer may be formed to the extent to which even an irregular portion of the surface of the solid electrolyte is well covered. In the first metal (M1)-X composite layer, X indicates a halogen.

The term "conformal coating layer" used herein refers to a coating layer having excellent conformality.

The term "conformality" as used herein, which is so called a step coverage, is defined as: i) a ratio of an x-axis film formation rate to a y-axis film formation rate by percent (%); or ii) a ratio of an average thickness of a layer formed in a vertical direction to an average thickness of a layer formed in a horizontal direction. A conformality of the conformal coating layer may be about 80% to about 100%, about 82% to about 100%, about 83% to about 99%, about 85% to about 99%, or about 90% to about 95%. The conformality may be observed using an electron scanning microscopy (SEM) analysis.

After a lithium metal is disposed on the resultant, heat treatment is carried out at a temperature exceeding 150° C. According to the manufacturing method described above, the anode may be prepared by forming an interlayer, which includes a composite including a lithium-first metal (Li-M1) alloy having a particle size of about 0.1 nm to about 300 nm as a first metal (M1) material, and a lithium ion conductor; and a first anode active material layer including a lithium-second metal alloy (Li-M2) having a particle size of about 0.1 μm to about 20 μm.

The heat treatment may be carried out at a temperature exceeding about 150° C., for example, at about 190° C. to about 250° C., about 195° C. to about 240° C., or about 200° C. to about 230° C. When the heat treatment temperature is within these ranges, a chemical conversion reaction between lithium metal and the M1-X composite layer formed on the solid electrolyte is facilitated, so that the interlayer and the first anode active material layer can be simultaneously formed at uniform thicknesses. In addition, through the heat treatment, adhesion of the interlayer and the first anode active material layer to the solid electrolyte may be enhanced. In addition, the interlayer and the first anode active material layer are in good contact at the interface, voids and defects do not occur.

In the providing of the interlayer, the composition comprising the first metal and the halogen (M1)-X is provided on a first surface of the solid electrolyte to form a first metal (M1)-X composite layer on the surface of the solid electrolyte. The composite layer comprising first metal and the halogen may include a compound of the formula (M1)-X, for example, LiF, which has electronically insulating characteristics and lithiophilicity. Accordingly, contact characteristics between the electrolyte and the first anode active material (lithium metal) layer may be improved, and thus, interfacial resistance may be reduced.

In the providing of the composition comprising the first metal and the halogen (M1)-X on the first surface of the solid electrolyte, the composition may be coated on the first surface of the solid electrolyte to provide a coated solid electrolyte, and then the coated solid electrolyte may be dried at a temperature of about 30° C. to about 80° C., or about 40° C. to about 75° C.

The first metal (M1)-X composite layer may be formed by dropwise addition of the composition comprising the first metal and the halogen (M1)-X onto the solid electrolyte. When the first metal (M1)-X composite layer is formed by this method, it is easy to control the amount of the first metal (M1)-X composite layer in comparison with a method of dipping the solid electrolyte in the composition comprising the first metal and the halogen (M1)-X, and the location and the area of the composite layer formed may be controlled.

The first metal (M1)-X composite layer may be coated using a wet coating process. The wet coating refers to liquid coating. When the wet coating is followed by a drying process, the interlayer may be formed simply at a relatively low temperature and at low costs, as a conformal coating layer filling the defects and cracks of the solid electrolyte.

The composition comprising the first metal and the halogen (M1)-X may include a compound of the first metal and the halogen (M1)-X and a solvent. In the first metal (M1)-X, X is a halogen, and may be, for example, Cl, F, I, Br, or a combination thereof.

The first metal and the halogen (M1)-X may be, for example, $SnCl_x$ (wherein $0<x\leq6$), $SnBr_x$ (wherein $0<x\leq6$), $SnF_x$ (wherein $0<x\leq6$), $SnI_x$ (wherein $0<x\leq6$), $BiCl_3$, $Bi_6Cl_7$, $BiBr_x$ (wherein $0<x\leq6$), $BiF_x$ (wherein $0<x\leq6$), $BiI_x$ (wherein $0<x\leq6$), $AgF_x$ (wherein $0<x\leq4$), $AgCl_x$ (wherein $0<x\leq2$), $AgBr_x$ (wherein $0<x\leq2$), $AgI_x$ (wherein $0<x\leq2$), or a combination thereof.

The solvent may be isopropanol, ethanol, butanol, propanol, methanol, or a combination thereof. A content of the first metal and the halogen (M1)-X in the composition comprising first metal (M1)-X may be about 0.5 part to about 50 parts by weight, with respect to 100 parts by weight of a total weight of the composition comprising the first metal (M1)-X. When the content of the first metal (M1)-X in the composition comprising the first metal (M1)-X is within this range, it may be facilitated to provide a required amount of the composition comprising the first metal (M1)-X onto the solid electrolyte.

The drying process may be carried out at a temperature of, for example, about 30° C. to about 80° C., or about 50° C. to about 70° C.

As a result, when a lithium metal is disposed on the first metal (M1)-X composite layer, the interlayer that includes a composite including a lithium ion conductor (Li—X) and a lithium-first metal (Li-M1) alloy having a particle size of about 0.1 nm to about 300 nm is formed, so that the interfacial resistance between the solid electrolyte and the anode is reduced. A thickness of the interlayer may be, for example, about 300 nm to about 500 nm. A thickness of the lithium metal may be about 1 um to about 500 um. When a lithium metal having a thickness within this range is used, the interlayer and the first anode active material layer that have a desired 2-layer structure may be obtained.

When the first metal (M1)-X is $SnF_x$ (wherein $0<x\leq6$), for example, $SnF_2$, a chemical conversion reaction as illustrated in Reaction scheme 1 may take place to simultaneously form the interlayer, which includes a composite including a first metal (M1) material having a particle size of about 0.1 nm to about 300 nm and an lithium ion conductor; and the first anode active material layer, which includes lithium metal and a second lithium metal alloy ($Li_ySn$) as a first metal (M1) material having a particle size of about 0.1 μm to about 20 μm.

$$SnF_2+xLi\rightarrow2LiF+Li_xSn \qquad \text{Reaction scheme 1}$$

In Reaction scheme 1, $0<x<5$.

When the anode described above is provided, a high critical current density of 2.4 milliamperes per square centimeter ($mAcm^{-2}$) at maximum may be implemented, and stable constant-current cycles may be ensured. For example, when a Garnet-type solid electrolyte is used as the solid electrolyte, an excellent cycle lifetime of 600 times or more can be provided at a current density of 1.0 $mAcm^{-2}$.

The preparing of the anode may include preparing the anode material layer by further disposing a second anode active material layer.

In an embodiment, the second anode active material layer may include: i) a carbonaceous anode active material; or ii) a carbonaceous anode active material and a second metal (M2) or a metalloid anode active material.

The providing of the second anode active material layer may include: coating a composition on a first substrate, drying the coated first substrate, wherein the composition comprises i) a carbonaceous anode active material or ii) a carbonaceous anode active material and a second metal (M2) or metalloid anode active material; and disposing the resulting coated first substrate on the first anode active material layer, and separating the first substrate therefrom.

For example, the first substrate may comprise a material that does not react with lithium, i.e., a material that does not form an alloy or compound with lithium. A material of the first substrate may be, for example, copper (Cu), stainless steel, titanium (Ti), iron (Fe), cobalt (Co), nickel (Ni), or a combination thereof. However, embodiments are not limited thereto. Any material suitable in the art as an electrode current collector may be used. The first substrate may include one type of the metal described above, or an alloy of at least two metals or a coating material. The first substrate may be, for example, in a plate shape or a foil shape. The first substrate may be, for example, a stainless steel substrate or an anode current collector.

The method may include binding the second anode active material layer to the first anode active material layer by pressing.

A pressure applied during the pressing may be, for example, about 150 megapascals (MPa) or greater. The pressure applied during the pressurization may be, for example, about 250 MPa or greater. The pressure applied during the pressing may be, for example, about 1,000 MPa or less.

The time of the pressing may be within about 10 minutes. For example, the time of the pressing may be about 5 milliseconds (ms) to about 10 minutes (min). For example, the time of the pressing may be about 2 min to about 7 min.

The pressing may be carried out, for example, at room temperature (25° C.). The pressing may be carried out, for example, at a temperature of about 15° C. to about 25° C. However, the pressing temperature is not necessarily limited thereto, and may be about 25° C. to about 90° C., or a high temperature of 100° C. or greater.

The pressing may be, for example, roll pressing, uni-axial pressing, flat pressing, warm isotactic pressing (WIP), or cold isotactic pressing (CIP), but is not necessarily limited thereto. Any suitable pressing method in the art may be used.

In an embodiment, the second anode active material layer may be a lithium precipitation layer that is formed by inducing lithium metal to precipitate on the anode current collector 21 and prevents direct contact between lithium metal and the solid electrolyte.

The second anode active material layer may be a lithium metal or a third metal (M3) coated on the current collector. In some embodiments, the second anode active material layer may be a lithium metal or lithium alloy layer precipitated during charge. Due to the precipitation of lithium during charge, a volume and a thickness of the second anode active material layer may be increased. In addition, the third metal (M3) may form a Li-M3 alloy through a reversible reaction during charge and discharge of an all-solid secondary battery. In charge and discharge of the all-solid secondary battery and/or in binding into the all-solid secondary battery, the second anode active material layer may be formed as a precipitation layer, and the second anode active material layer may be a lithium metal layer or a lithium metal alloy layer.

While charging and discharging of the all-solid secondary battery and/or while assembling the all-solid secondary battery, the third metal (M3) in the second anode active material layer may form an alloy with lithium.

The manufacturing method may include disposing the second negative active material layer to the first negative active material layer, the interlayer, and the electrolyte assembly through pressurization. During the pressing, a portion of lithium included in the second anode active material layer may be injected into the interlayer.

The assembling may comprise pressing. During the pressing, a portion of lithium included in the second anode active material layer may be injected into the first anode active material layer and/or the interlayer. Accordingly, the first anode active material layer may have a composition including a carbonaceous active material and lithium, and the interlayer may include a composite including a lithium ion conductor and a lithium-first metal (M1) alloy.

A pressure applied during the pressing may be, for example, about 150 MPa or greater. The pressure applied during the pressing may be, for example, about 250 MPa or greater. The pressure applied during the pressing may be, for example, about 1,000 MPa or greater.

The time of the pressing may be within 10 minutes. For example, the time of the pressing may be about 5 milliseconds (ms) to about 10 minutes (min). For example, the time of the pressing may be about 2 min to about 7 min.

The pressing may be carried out, for example, at room temperature (25° C.). The pressing may be carried out, for example, at a temperature of about 15° C. to about 25° C. However, the pressing temperature is not necessarily limited thereto, and may be about 25° C. to about 90° C., or a high temperature of 100° C. or greater.

The pressing may be, for example, roll pressing, uni-axial pressing, flat pressing, warm isotactic pressing (WIP), or cold isotactic pressing (CIP), but is not necessarily limited thereto. Any suitable pressing method in the art may be used.

In an embodiment, a third anode active material layer may be further formed as a precipitation layer during charge and discharge of the all-solid secondary battery or/and during binding into the all-solid secondary battery. The third anode active material layer may be a lithium metal layer or a lithium metal alloy layer. A thickness of the third anode active material layer may be, for example, about 1 μm or greater, about 5 μm or greater, about 10 μm or greater, about 10 μm to about 1,000 μm, about 10 μm to about 500 μm, about 10 μm to about 200 μm, about 10 μm to about 100 μm, or about 10 μm to about 50 μm.

Preparation of Cathode

A cathode active material, a binder, as the ingredients of the cathode active material layer 12, may be added to a non-polar solvent to prepare a slurry. The prepared slurry may be coated on the cathode current collector 11 and the coated cathode current collector may be dried. The resulting laminate may be pressed to prepare the anode 10. For example, the pressing may be carried out using, for example, roll pressing, flat pressing, or isotactic pressing. However, embodiments are not limited thereto, and any pressing method suitable in the art may be used. The pressing may be omitted. In an embodiment, the cathode 10 may be formed by compaction-molding a mixture of the ingredients of the cathode active material layer 12 into pellets or extending the mixture into a sheet form. When the cathode 10 is prepared by this method, the cathode current collector 11 may be omitted. In an embodiment, the cathode 10 may be impregnated with a liquid electrolyte before use.

Preparation of Solid Electrolyte

For example, the solid electrolyte 30 including an oxide-based solid electrolyte may be prepared by thermally treating precursors of an oxide-based solid electrolyte material.

The oxide-based solid electrolyte may be prepared by mixing the precursors in stoichiometric amounts to form a mixture and thermally treating the mixture. For example, the mixing may include milling such as ball milling, or grinding. The mixture of the precursors mixed in a stoichiometric composition may be subjected to a first thermal treatment under oxidizing atmosphere to prepare a first thermal treatment product. The first thermal treatment may be carried out in a temperature range less than about 1000° C. for about 1 hour to about 36 hours. The first thermal treatment product may be ground. The grinding of the primary heat treatment product may be carried out either in a dry method or in a wet method. For example, the wet grinding may be carried out by mixing the first thermal treatment product with a solvent such as methanol, and then milling with a ball mill for about 0.5 hour to about 10 hours. The dry grinding may be carried out by milling with a ball mill without a solvent. A diameter of the ground first thermal treatment product may be about 0.1 μm to about 10 μm, or about 0.1 μm to about 5 μm. The ground first thermal treatment product may be dried. The ground first thermal treatment product may be mixed with a binder solution and shaped into pellets, or may be shaped into pellets by simply pressing at a pressure of about 1 ton to about 10 tons.

The shaped product may be subjected to a second thermal treatment at a temperature less than about 1000° C. for about 1 hour to about 36 hours. The solid electrolyte 30, which is a sintered product by the second thermal treatment, may be obtained. The second thermal treatment may be carried out, for example, at a temperature of about 550° C. to about 1000° C. For example, the second thermal treatment time may be about 1 hour to about 36 hours. To obtain the sintered product, the second thermal treatment temperature may be greater than the first thermal treatment temperature. For example, the second thermal treatment temperature may be greater than the first thermal treatment temperature by about 10° C. or greater, about 20° C. or greater, about 30° C. or greater, or about 50° C. or greater. The second thermal treatment of the shaped product may be carried out under oxidizing atmosphere, reducing atmosphere, or a combination thereof.

For example, the solid electrolyte 30 including a sulfide-based solid electrolyte may be prepared using a solid electrolyte including a sulfide-based solid electrolyte material.

The sulfide-based solid electrolyte may be prepared by treatment of a source material with, for example, melt quenching or mechanical milling. However, embodiments are not limited thereto. Any method of preparing a sulfide-based solid electrolyte suitable in the art may be used. For example, in the case of using melt quenching, after predetermined amounts of source materials such as $Li_2S$ and $P_2S_5$ are mixed together and then made into pellets, the pellets may be subjected to reaction at a predetermined reaction temperature under vacuum conditions and then quenched to thereby prepare a sulfide-based solid electrolyte. The reaction temperature of the mixture of $Li_2S$ and $P_2S_5$ may be, for example, about 400° C. to about 1000° C., or about 800° C. to about 900° C. The reaction time may be, for example, about 0.1 hours to about 12 hours, or about 1 hour to about 12 hours. The quenching temperature of the reaction product may be about 10° C. or less, or about 0° C. or less, and the quenching rate may be about 1° C./second (sec) to about 10,000° C./sec, or about 1° C./sec to about 1,000° C./sec. For example, in the case of using mechanical milling, the source materials such as $Li_2S$ and $P_2S_5$ may be reacted while stirring using, for example, a ball mill, to thereby prepare a sulfide-based solid electrolyte. Although the stirring rate and stirring time in the mechanical milling are not specifically limited, the higher the stirring rate, the production rate of the sulfide-based solid electrolyte may become greater, and the longer the stirring time, the rate of conversion of the source materials into the sulfide-based solid electrolyte may become greater. Then, the mixture of the source materials, obtained by melting quenching or mechanical milling, may be thermally treated at a predetermined temperature and then ground to thereby prepare a solid electrolyte in a form of a particle. When the solid electrolyte has glass transition characteristics, the solid electrolyte may be converted from an amorphous form to a crystalline form by thermal treatment.

The solid electrolyte obtained through such a method as described above may be deposited using a known film formation method, for example, an aerosol deposition method, a cold spraying method, or a sputtering method, to form the solid electrolyte 30. In an embodiment, the solid electrolyte 30 may be prepared by pressing solid electrolyte particles alone. In an embodiment, the solid electrolyte 30 may be formed by mixing a solid electrolyte, a solvent, and a binder together to obtain a mixture, and coating, drying, and then pressing the mixture.

Manufacture of all-Solid Secondary Battery

The anode 20, the cathode 10, and the solid electrolyte 30, which are manufactured by the methods described above, are prepared and stacked so that the solid electrolyte 30 is placed between the cathode 10 and the anode 20, followed by pressing, thereby manufacturing an all-solid secondary battery.

The pressing may be, for example, roll pressing, uni-axial pressing, flat pressing, warm isotactic pressing (WIP), cold isotactic pressing (CIP), or a combination thereof, but is not necessarily limited thereto. Any suitable pressing method in the art may be used. A pressure applied during the pressing may be, for example, about 50 MPa to about 750 MPa. The time of the pressing may be about 5 ms to about 5 min. The pressing may be carried out, for example, at a temperature from room temperature (25° C.) to about 90° C. or less, or at a temperature from about 20° C. to about 90° C. In some embodiments, the pressing may be carried out at a high temperature of about 100° C. or greater.

Next, the cathode 10 may be placed on the second surface of the solid electrolyte 30 opposite to the first surface with the anode 20 disposed thereto, and then pressed under a given pressure to bind the cathode 10 to second surface of the solid electrolyte 30. In an embodiment, when the cathode 10 is impregnated with a liquid electrolyte, the all-solid secondary battery may be manufactured by stacking without pressure.

The pressing may be, for example, roll pressing, uni-axial pressing, flat pressing, warm isotactic pressing (WIP), cold isotactic pressing (CIP), or a combination thereof, but is not necessarily limited thereto. Any suitable pressing method in the art may be used. A pressure applied during the pressing may be, for example, about 50 MPa to about 750 MPa. The time of the pressing may be about 5 ms to about 5 min. The pressing may be carried out, for example, at a temperature from room temperature (25° C.) to about 90° C. or less, or at a temperature from about 20° C. to about 90° C. In some embodiments, the pressing may be carried out at a high temperature of about 100° C. or greater.

The structures of the all-solid secondary battery 1 and the methods of manufacturing the all-solid secondary battery 1 described above are merely embodiments for illustrative purposes, and thus, the disclosure is not limited thereto, and the constituent members of the all-solid secondary battery and the manufacturing processes may be appropriately varied. The pressing may be omitted.

The anode for an all-solid secondary battery, according to the one or more embodiments, may be utilized in a high-energy-density mobile battery or electric vehicle. In the high-energy-density mobile battery or electric vehicle, an oxide-based solid electrolyte may be used.

Hereinafter, the inventive concept of the present disclosure will now be described in detail with reference to the following examples and comparative examples. These examples are for illustrative purposes only and are not intended to limit the scope of the inventive concept.

EXAMPLES

Example 1: (LiF+LixSn Nano-Particles)/(Li+LiySn Micro-Particles) Manufacture of Anode-Solid Electrolyte Sub-Assembly A LLZTO ($Li_{6.5}La_3Zr_{1.5}Ta_{0.5}O_{12}$) pellet of a thickness of 350 μm was prepared as a solid electrolyte.

After a $SnF_2$ powder-dispersed isopropanol solution was slowly dropwise added to coat the surface of the LLZTO pellet, the pellet was dried in a vacuum oven at 60° C.

Subsequently, a lithium metal disc was put on the LLZTO pellet coated with the $SnF_2$ powder-dispersed isopropanol solution, followed by heat treatment to a temperature of 220° C. to form an interlayer ($LiF+Li_xSn$) and a first anode active material layer ($Li+Li_ySn$).

Then, a copper (Cu) foil of a thickness of 10 μm, as an anode current collector, was stacked thereon, and a pressure of 100 megaPascals (MPa) was applied thereto at 25° C. by cold isotactic pressing (CIP), to thereby prepare a solid electrolyte/interlayer/first anode active material layer/anode current collector, as a anode-solid electrolyte sub-assembly.

Preparation of Cathode $LiFePO_4$ (LFP) as a cathode active material, Super P (carbon black) as a conductive material, and polytetrafluoroethylene (Teflon (registered trademark) binder produced by Dupont) as a binder were mixed in a weight ratio of 80:10:10, and N-methyl-2-pyrrolidone as a solvent was added thereto to prepare a slurry.

The slurry was coated on an anode coil, an anode current collector, and dried overnight in a vacuum condition at 60° C. to form a cathode including a cathode active material layer.

The cathode active material layer of the cathode was impregnated with a liquid electrolyte in which 2.0M lithium bis(fluorosulfonyl)imide (LiFSI) was dissolved in N-propyl-N-methyl-pyrrolidinium bis(fluorosulfonyl)imide (PYR1-3FSI).

Manufacture of all-Solid Secondary Battery

The cathode was arranged into a stainless steel (SUS) cap so that the cathode active material layer impregnated with the ionic liquid-containing liquid electrolyte faces the upper end of the cap. The anode-solid electrolyte sub-assembly, was disposed such that the solid electrolyte was located on the cathode active material layer, followed by sealing, to thereby manufacture an all-solid secondary battery. The cathode and the anode were insulated with an insulator. A part of the cathode current collector and a part of the anode current collector were protruded to the outside of the sealed battery and used as a cathode terminal and an anode terminal, respectively.

As the all-solid secondary battery obtained according to the processes described above was charged and discharged, an interlayer including lithium fluoride (LiF) and $Li_xSn$ (wherein $0 < x < 5$), and a first anode active material layer including lithium metal and $Li_xSn$ (wherein $0 < x < 5$) were formed. The size of $Li_xSn$ (wherein $0 < x < 5$) in the interlayer was about 50 nm, and the size of $Li_xSn$ ($0 < x < 5$) in the first anode active material layer was 10 μm.

An image of the anode manufactured according to Example 1 is shown in FIG. 8.

Referring to FIG. 8, it could be confirmed that in the manufacturing of the solid electrolyte/interlayer/first anode active material layer/anode current collector, a lithium metal disc was put on the LLZTO pellet coated with the $SnF_2$ powder-dispersed isopropanol solution, and as a result of the heat treatment to 220° C. performed to facilitate chemical conversion reaction, lithium fluoride (LiF) and Sn were formed.

As shown in FIG. 8, the clean pellet coated with a $SnF_2$ layer (white) were gradually changed into black as the heat treatment temperature gradually increased. From this change, it was found that $SnF_2$ reacted with lithium metal. A relatively rapid and uniform conversion reaction was proceeded on the entire region of the $SnF_2$ layer, not only the lithium metal disc, at 220° C.

Example 2

An all-solid secondary battery was manufactured in the same manner as in Example 1, except that $LiNi_{1/3}Co_{1/3}Mn_{1/3}O_2$ (NCM111) instead of $LiFePO_4$ (LFP) was used as the cathode active material to form the cathode.

Examples 3 to 6

All-solid secondary batteries were manufactured according to the same method as in Example 1, except that the processes of forming the interlayer and the first anode active material layer were controlled so that $Li_xSn$ (wherein $0 < x < 5$) in the interlayer and $Li_ySn$ (wherein $0 < y < 5$) in the first anode active material layer had sizes as represented in Table 1.

TABLE 1

| Example | Size of $Li_xSn$ nanoparticles in interlayer (nm) | Size of $Li_ySn$ microparticles in first anode active material layer (μm) |
|---|---|---|
| Example 1 | 50 | 10 |
| Example 2 | 100 | 20 |
| Example 3 | 200 | 0.1 |
| Example 4 | 30 | 5 |
| Example 5 | 0.1 | 10 |
| Example 6 | 300 | 10 |

Comparative Example 1: Anode Comprising Single Lithium Metal Layer

Preparation of an Anode-Solid Electrolyte Sub-Assembly

A LLZTO ($Li_{6.5}La_3Zr_{1.5}Ta_{0.5}O_{12}$) pellet having a thickness of 350 μm were prepared as a solid electrolyte.

An anode with lithium (Li) metal of a thickness of 20 μm coated on a copper (Cu) foil of a thickness of 10 μm was disposed on a first surface of the LLZTO pellet, and a pressure of 250 MPa was applied by CIP at 25° C., to thereby prepare the anode-solid electrolyte sub-assembly.
Preparation of Cathode $LiFePO_4$ (LFP) as a cathode active material, Super P as a conductive material, and polytetrafluoroethylene (Teflon (registered trademark) binder produced by Dupont) as a binder were mixed in a weight ratio of 80:10:10, and N-methyl-2-pyrrolidone as a solvent was added thereto to prepare a slurry.

The slurry was coated on an anode coil, an anode current collector, and dried overnight in a vacuum condition at 60° C. to form a cathode including a cathode active material layer.

The cathode active material layer of the cathode was impregnated with a liquid electrolyte in which 2.0M LiFSI was dissolved in N-propyl-N-methyl-pyrrolidinium bis (fluorosulfonyl)imide (PYR13FSI).
Manufacture of all-Solid Secondary Battery The cathode was disposed such that the cathode active material layer soaked in the ionic liquid electrolyte solution faced toward an upper end in the SUS cap. The anode-solid electrolyte sub-assembly was arranged such that the solid electrolyte was located on the cathode active material layer, followed by sealing, to thereby manufacture an all-solid secondary battery.

The cathode and the anode were insulated with an insulator. A part of the cathode current collector and a part of the anode current collector were protruded to the outside of the sealed battery and used as a cathode terminal and an anode terminal, respectively.

Comparative Example 2

An anode-solid electrolyte sub-assembly and an all-solid secondary battery including the laminate were manufactured in the same manner as in Example 1, except that in the preparation of the solid electrolyte/interlayer/first anode active material/anode current collector, a lithium metal disc was put on the LLZTO pellet coated with the $SnF_2$ powder-dispersed isopropanol solution and then heat-treated at 120° C.

Evaluation Example 1: SEM-EDS Analysis

To examine the microstructure of the LLZTO pellet treated at 220° C. according to Example 1, cross-sectional analysis by scanning electron microscopy-energy dispersive spectroscopy (SEM-EDS) was carried out in an inert gas atmosphere. The SEM-EDS analyst results are shown in FIGS. 2A to 2C.

Figure 2A:
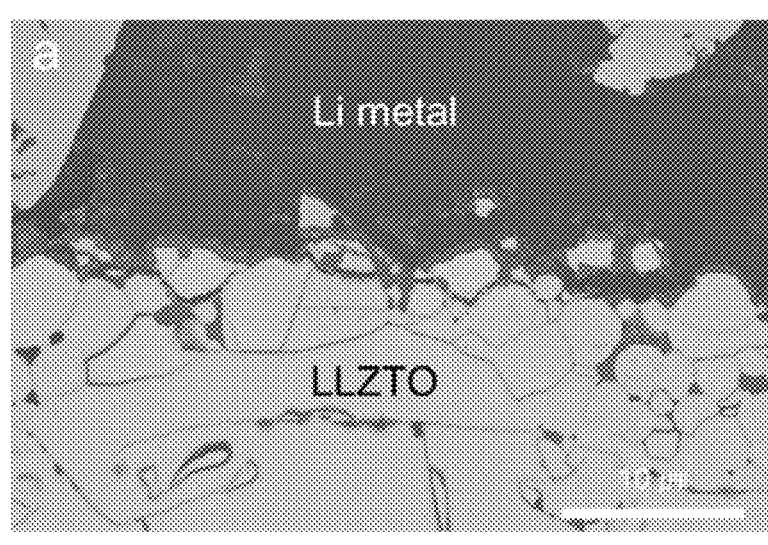
FIG. 2A shows the results of a scanning electron microscopy (SEM) analysis of an interface between $SnF_2$-treated LLZTO ($Li_{6.5}La_3Zr_{1.5}Ta_{0.5}O_{12}$) and lithium (Li) metal after heat treatment at 220° C. according to Example 1.

Referring to FIG. 2A, it was found that the LLZTO was covered by a thin conformal layer (hundreds of nanometers) in dark gray. According to the EDS mapping results for fluorine, tin, oxygen, and zirconium of FIGS. 2B1 to 2B4, it was observed that a layer containing LiF and Sn was formed on the LLZTO surface and a Li—Sn alloy was present as micro-sized particles (about 10 μm) in the matrix.

FIG. 2C illustrates a high-resolution SEM image in a backscattered electron mode, and it was found that a F-rich layer was formed with a thickness of several nanometers and comprising at least two phases. According to the profile of element lines of FIG. 2C, it was found that bright spots of the F-rich layer corresponded to a Sn-containing phase of the Li—Sn alloy. Combining the EDS results with the XPS results, it was found that most of Sn underwent an alloy reaction with excess lithium during the lithium metal-SnF$_2$ conversion reaction, and thus some Li—Sn particles were trapped in the interfacial LiF layer.

Evaluation Example 2: Electrochemical Stability

A lithium metal was stacked on either surface of the anode-solid electrolyte sub-assembly prepared according to Example 1, Comparative Example 1, and Comparative Example 2, to thereby manufacture lithium symmetric cells.

The interfacial resistances of the symmetric cells manufactured using the anode-solid electrolyte sub-assembly manufactured according to Example 1, Comparative Example 1, and Comparative Example 2 were measured.

The impedance of the pellet of each symmetric cell was measured by a 2-probe method using an impedance analyzer (Solartron 1400A/1455A impedance analyzer) at a temperature of 25° C. in an atmospheric condition. The frequency range was 0.1 Hertz (Hz) to 1 MHz, and the amplitude voltage was 10 millivolts (mV). Nyquist plots as results of the impedance measurement are shown in FIG. 3.

Figure 3:
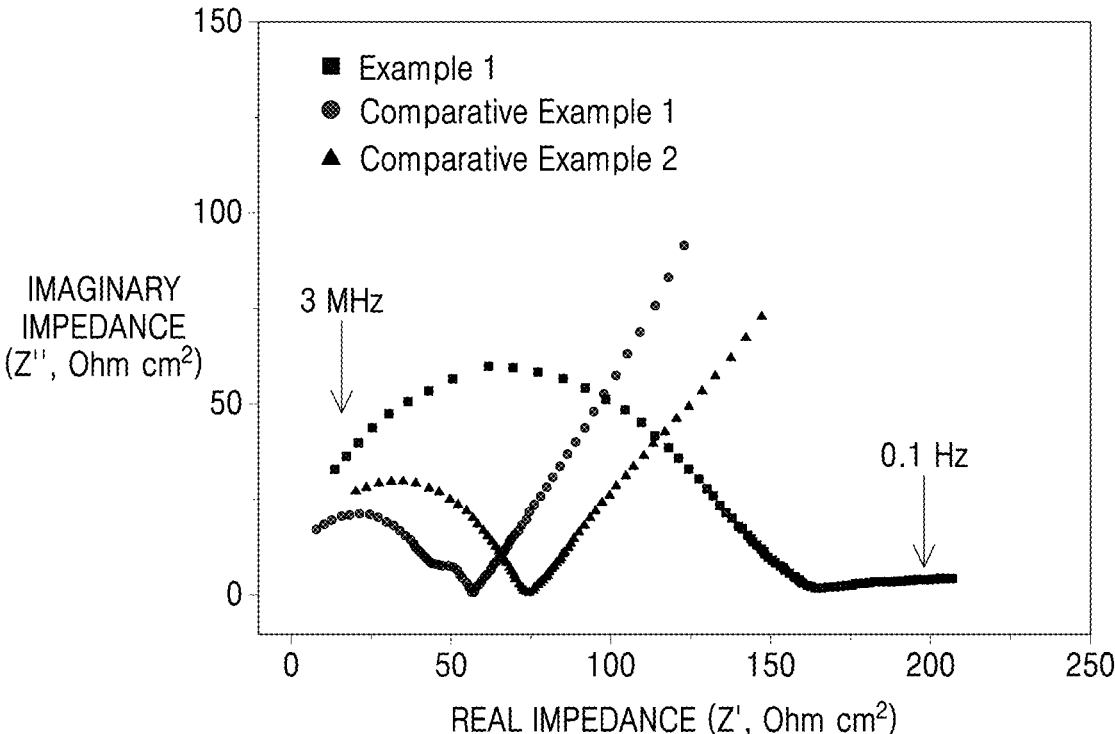

Referring to FIG. 3, it was found that the all-solid secondary battery of Example 1 had a greatly reduced interfacial resistance compared to the symmetric cells of Comparative Examples 1 and 2.

In addition, the critical current densities (CCDs) of the symmetric cells manufactured using the anode-solid electrolyte sub-assembly manufactured according to Example 1, Comparative Example 1, and Comparative Example 2 were measured. The results are shown in FIG. 4.

Figure 4:
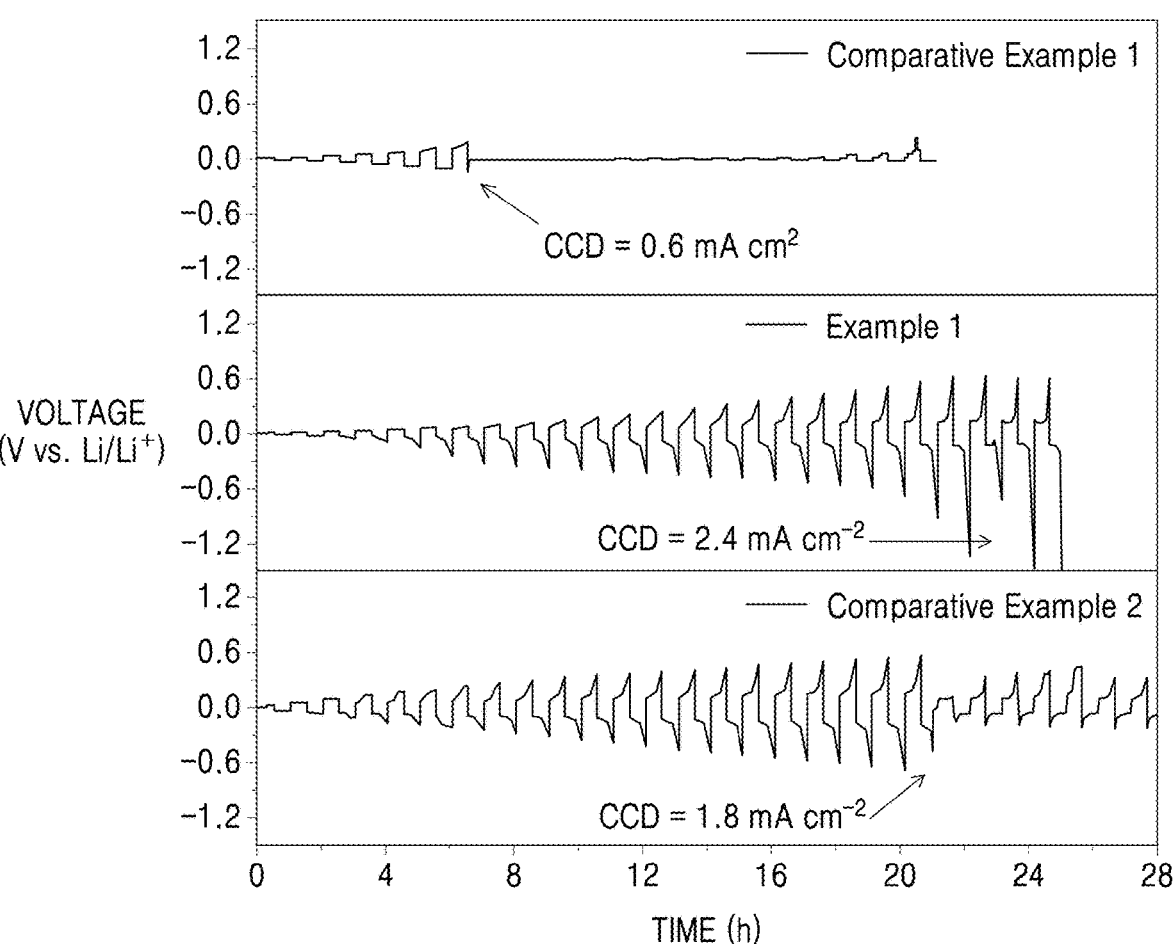

Referring to FIG. 4, the lithium symmetric cell manufactured using the anode-solid electrolyte sub-assembly of Example 1 was found to have a significantly increased CCD. When the SnF$_2$-treated LLZTO cell of Example 1 was used, the CCD was increased to a value of 2.4 mAcm$^{-2}$ at room temperature (25° C.). Such a high CCD value indicates that lithium dendrite formation through solid electrolyte can be effectively suppressed even in severe current conditions.

In comparison, in the lithium symmetric cell manufactured using the anode-solid electrolyte sub-assembly of Comparative Example 1, in which the uncoated LLZTO was used, a short circuit occurred early at a current density of 0.6 mAcm$^{-2}$. In addition, the lithium symmetric cell manufactured using the anode-solid electrolyte sub-assembly of Comparative Example 2 had a CCD value of 1.8 mA cm$^{-2}$.

Evaluation Example 3: Electrochemical Performance

Figure 5A:
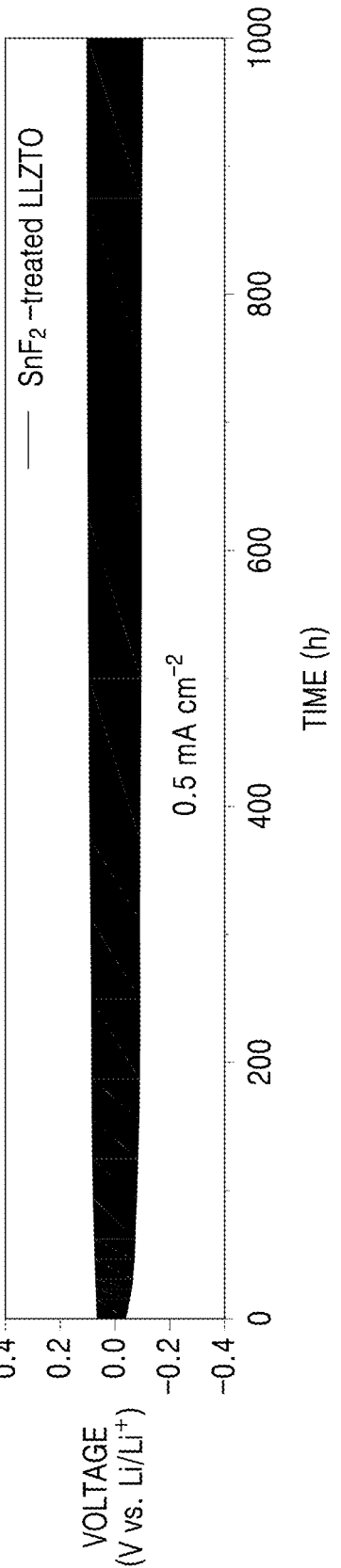
FIG. 5A is a graph of voltage (Volts vs. Li/Li⁺) vs. time (hour, h) and shows long-term operation performance results of the lithium symmetric cell using the sub-assembly of Example 1.
Figure 5B:
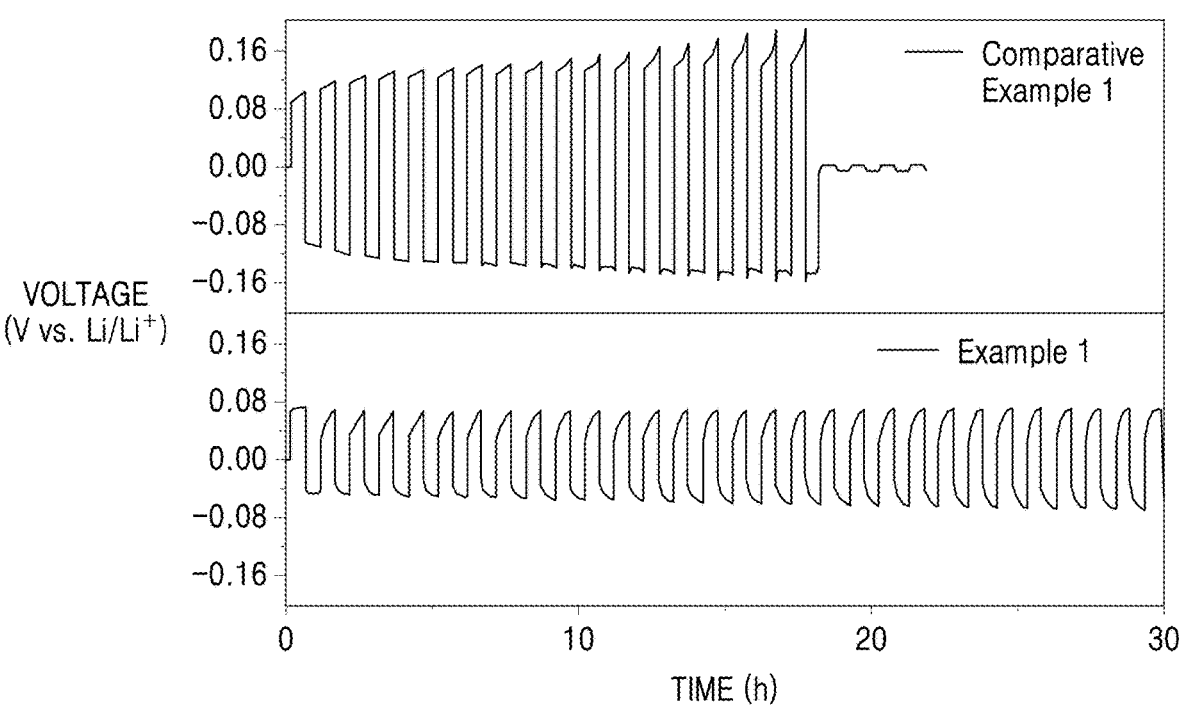
FIG. 5B is a graph of voltage (Volts vs. Li/Li⁺) vs. time (hour, h) and shows galvanostatic cycling analysis results of the lithium symmetric cells using the anode-solid electrolyte sub-assembly of Example 1 and Comparative Example 1.

Long-term operation performance of the lithium symmetric cell using the anode-solid electrolyte sub-assembly of Example 1 was evaluated. The results are shown in FIG. 5A. Galvanostatic cycling analysis was carried out on the lithium symmetric cells using the anode-solid electrolyte sub-assembly of Example 1 and Comparative Example 1. The analysis results are shown in FIG. 5B. In addition, to investigate the interface between the electrolyte and the anode, cross-sections of the laminates were analyzed by scanning electron microscopy (SEM). The analysis results are shown in FIGS. 5C and 5D.

FIGS. 5A and 5B comparatively illustrate long-term cycle stabilities at room temperature (25° C.) and a current density of 0.5 mA cm$^{-2}$ in the lithium symmetric cells using the SnF$_2$-treated LLZTO and the uncoated LLZTO, respectively. Referring to FIGS. 5A and 5B, the galvanostatic profile of the uncoated LLZTO exhibited an initial overpotential of about 100 mV and a gradual increase with cycles. In addition, a short circuit was observed in 20 hours, which is consistent with the forgoing results at the same current density.

In comparison, in the SnF$_2$-treated LLZTO battery, dissolution and deposition cycles were steadily maintained for 1000 hours or more at an overpotential of about 80 mV without a significant increase with cycles.

Figure 5C:
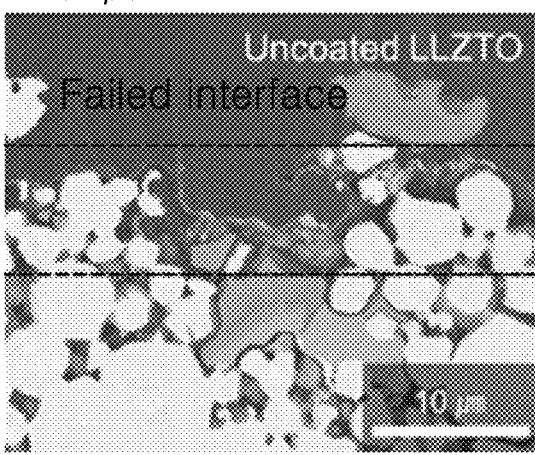
FIG. 5C illustrates a SEM analysis result of a cross-section of the anode-solid electrolyte sub-assembly of Example 1, showing an interface of the solid electrolyte and the anode layer.
Figure 5D:
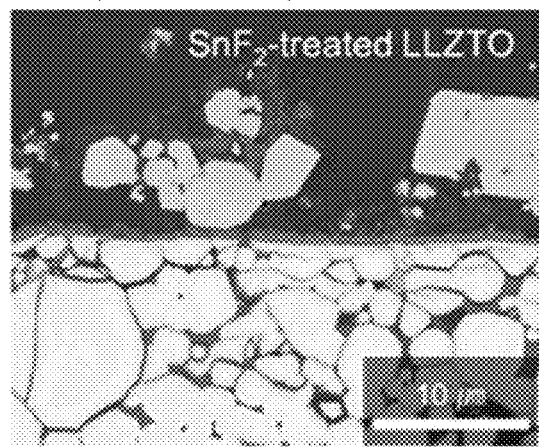
FIG. 5D illustrates a SEM analysis result of a cross-section of the electrolyte-anode sub-assembly of Comparative Example 1, showing an interface of the solid electrolyte and the anode.

In addition, to evaluate the stability of the interlayers after cycling, the cells were disassembled before the occurrence of a short circuit (galvanostatic cycling for about 15 hours at a current density of 0.5 mA cm$^{-2}$), and the interfaces were comparatively observed as shown in FIG. 5C.

From the cross-sectional SEM images of the uncoated LLZTO (Comparative Example 1) and the SnF$_2$-treated LLZTO (Example 1), it was found that in the case of the uncoated LLZTO, a severe damage occurred in the interface between the solid electrolyte and the anode, and pores and voids were detected widely in the surface of the solid electrolyte and inside the solid electrolyte as well. Due to a severe deterioration in the solid electrolyte structure near the interface, caused by repeated dissolution and deposition of lithium, a short circuit occurred early in the uncoated LLZTO cell.

However, in the SnF$_2$-treated LLZTO (Example 1), interfacial stability was maintained without defects.

An additional galvanostatic cycling test at an increased current density of 1.0 mA cm$^{-2}$ was carried out on the symmetric cell provided with the SnF$_2$-treated LLZTO of Example 1. As a result, it was found that stability and compatibility of the LLZTO and the lithium metal were significantly improved.

In addition, lithium symmetric cells were manufactured using the anode-solid electrolyte sub-assembly of Examples 3 to 6, instead of the anode-solid electrolyte sub-assembly of Example 1, and long-term operation performances of the lithium symmetric cells were evaluated according to the same method as applied to the lithium symmetric cell including the anode-solid electrolyte sub-assembly of Example 1.

As a result of the evaluation, the lithium symmetric cells including the anode-solid electrolyte sub-assembly of Examples 3 to 6 exhibited levels of long-term operation performance equivalent to that of the lithium symmetric cell including the anode-solid electrolyte sub-assembly of Example 1.

Evaluation Example 4: Electrochemical Performance

Figure 6:
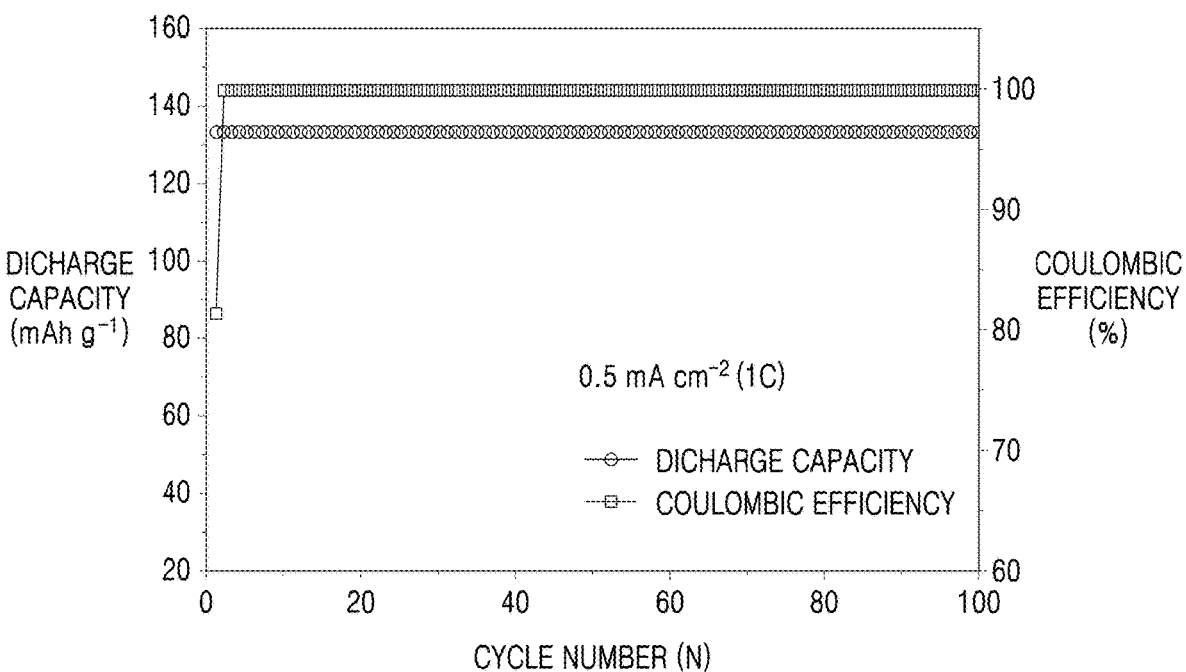
FIG. 6 is a graph of discharge capacity (milliampere hours per gram, mAhg⁻¹) vs. cycle number (n) illustrating results of long-term performance of at a current density of 0.5 mA/cm$^2$ and room temperature (25° C.) of a Li/SnF$_2$-treated LLZTO/NCM111 cell manufactured according to Example 2.

Long-term operation performance of the all-solid secondary battery of Example 2 was evaluated. The result is shown in FIG. 6. FIG. 6 is a graph illustrating the long-term operation performance at a current density of 0.5 mA/cm$^2$ and room temperature (25° C.) of a Li/SnF$_2$-treated LLZTO/NCM111 battery manufactured according to Example 2.

Referring to FIG. 6, it was found that the all-solid secondary battery of Example 2 had improved lifespan characteristics due to the inclusion of the anode with improved durability.

Evaluation Example 5: Cycle Characteristics

Cycle characteristics of the all-solid secondary battery of Example 1 were analyzed. The analysis results are shown in FIG. 7A. FIG. 7A is a graph illustrating long-term performance of a Li/SnF$_2$-treated LLZTO/LiFePO$_4$ full cell at room temperature (25° C.) and a current density of 1.0 mA cm$^{-2}$. The long-term performance indicates the galvanostatic cycling performance of the cell for 600 cycles at a current density of 1.0 mA cm$^{-2}$ with respect to lithium electrode.

The all-solid secondary battery of Example 1 was found to have an excellent cycling stability of 99% or greater after 600 cycles.

For comparison with the cycle characteristics of the all-solid secondary battery of Example 1, it was attempted to evaluate cycle characteristics of an all-solid secondary battery using the uncoated LLZTO electrolyte, at the same current density of 1.0 mA cm$^{-2}$. However, charge and discharge cycling of this all-solid secondary battery at room temperature (25° C.) was not proceeded.

A short circuit of the battery was observed only after the first cycle at 1.0 mA cm$^{-2}$, indicating that lithium metal was propagated into the solid electrolyte at the current density. Instead, cycling the two batteries were carried out with a 10-fold lower current density (for example, of 0.1 mA cm$^{-2}$ (0.2 C for the LFP anode), which was low enough to prevent a short circuit.

FIG. 7B is a graph comparatively illustrating the possibility of cycling at 0.1 mA cm$^{-2}$ of the batteries with the uncoated LLZTO and the SnF$_2$-treated LLZTO.

FIG. 7B shows that the Li/SnF$_2$-treated LLZTO/LFP battery maintained a high capacity of 140 mAhg$_{cathode}^{-1}$ after 100 cycles without noticeable capacity loss, whereas the battery with the uncoated LLZTO had a reduced capacity of 79%. FIG. 7B also shows similar initial values and a short circuit occurring finally after 80 cycles in the battery with the uncoated LLZTO. In addition, rate capability of the Li/SnF$_2$-treated LLZTO/LFP battery was evaluated at current densities of 0.1 C-2 C, as shown in FIG. 7C. The discharge capacities of the all-solid battery at the current densities of 0.05, 0.1, 0.25, 0.5, and 1.0 mA cm$^{-2}$ were 144, 140, 132, 123, and 110 mAhg$_{cathode}^{-1}$, respectively.

Referring to FIG. 7D, it was found that a general discharge profile of the LFP cathode of Example 1 was maintained in the Li/SnF$_2$-treated LLZTO/LFP battery.

An additional test was carried out on the SnF$_2$-treated LLZTO electrolyte of the all-solid secondary battery of Example 2 using the LiNi$_{1/3}$Co$_{1/3}$Mn$_{1/3}$O$_2$ cathode.

As a result of the test, it was found that the SnF$_2$-treated LLZTO acted as a stable solid electrolyte even with the LiNi$_{1/3}$Co$_{1/3}$Mn$_{1/3}$O$_2$ cathode to provide a capacity of about 130 mAhg$^{-1}$ at a current density of 0.5 mA cm$^{-2}$.

In comparison, although it is difficult to simultaneously achieve high-rate capability and long-term durability with a garnet-type solid electrolyte, the all-solid battery exhibited long-term stability of 600 cycles or greater with a high rate of 1.0 mAcm$^{-2}$.

As described above, according to the one or more embodiments, when the anode for an all-solid secondary battery is used, an all-solid secondary battery having improved high-rate capability and lifespan characteristics due to electrical penetration of the solid electrolyte being prevented and improved contact and interfacial characteristics between the solid electrolyte and the anode, may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An anode-solid electrolyte sub-assembly for an all-solid secondary battery, the anode-solid electrolyte sub-assembly comprising:
   an anode current collector;
   an anode material layer on the anode current collector; and
   a solid electrolyte on the anode material layer and opposite the current collector, wherein the anode material layer comprises
      an interlayer, which contacts the solid electrolyte and comprises a composite comprising a first metal material, and a lithium ion conductor; and
      a first anode active material layer disposed on a surface of the interlayer that faces the anode current collector, the first anode active material layer being positioned between the interlayer and the anode current collector the first anode active material layer comprising a lithium metal, a lithium alloy, or a combination thereof,
   wherein the lithium metal or the lithium alloy have a particle size greater than the particle size of the first metal material, and
   wherein the first metal material comprises a first metal that forms an alloy or a compound with lithium, a lithium-first metal alloy comprising the first metal and lithium, or a combination thereof.

2. The anode-solid electrolyte sub-assembly of claim 1, wherein the first metal material has a particle size of about 0.1 nanometer to about 300 nanometers.

3. The anode-solid electrolyte sub-assembly of claim 1, wherein the lithium alloy of the first anode active material layer has a size of about 0.1 micrometer to about 20 micrometers.

4. The anode-solid electrolyte sub-assembly of claim 1, wherein the interlayer has a thickness of 5 micrometers or less, and the first anode active material layer has a thickness of about 1 micrometer to about 100 micrometers.

5. The anode-solid electrolyte sub-assembly of claim 1, wherein the first metal material comprises the first metal, the lithium-first metal alloy, or a combination thereof, wherein the first metal is tin, indium, silicon, gallium, aluminum, titanium, zirconium, niobium, germanium, antimony, bismuth, zinc, gold, platinum, palladium, nickel, iron, cobalt, chromium, magnesium, cesium, silver, sodium, potassium, calcium, yttrium, bismuth, tantalum, hafnium, barium, vanadium, strontium, tellurium, lanthanum, or a combination thereof, and wherein the lithium-first metal alloy is a lithium alloy comprising lithium and the first metal, and the first metal comprises tin, indium, silicon, gallium, aluminum, titanium, zirconium, niobium, germanium, antimony, bismuth, zinc, gold, platinum, palladium, nickel, iron, cobalt, chromium, magnesium, silver, cesium, lanthanum, or a combination thereof; or a combination of the lithium alloys.

6. The anode-solid electrolyte sub-assembly of claim 1, wherein the lithium ion conductor of the interlayer comprises lithium chloride, lithium bromide, lithium iodide, lithium fluoride, lithium oxide, lithium nitride, lithium nitrate, lithium perchlorate, or a combination thereof.

7. The anode-solid electrolyte sub-assembly of claim 1, wherein the composite of the interlayer comprises the first metal material dispersed in a matrix comprising the lithium ion conductor.

8. The anode-solid electrolyte sub-assembly of claim 1, wherein the first anode active material layer comprises the lithium metal and the lithium alloy, the lithium alloy is dispersed in the lithium metal, and the lithium alloy and the lithium metal are in a form of a mixture.

9. The anode-solid electrolyte sub-assembly of claim 1, wherein the lithium alloy of the first anode active material layer comprises lithium and a second metal, wherein the second metal is tin, indium, silicon, gallium, aluminum, titanium, zirconium, niobium, germanium, antimony, bismuth, zinc, gold, platinum, palladium, nickel, iron, cobalt, chromium, magnesium, silver, cesium, lanthanum, or a combination thereof, or a combination of these lithium alloys, and the lithium alloy is a Li—Ag alloy, a Li—Au alloy, a Li—Al alloy, a Li—Sn alloy, a Li—In alloy, a Li—Zn alloy, a Li—Ge alloy, a Li—Te alloy, a Li—Ga alloy, a Li—Si alloy, a Li—Sb alloy, a Li—Bi alloy, a Li—Mg alloy, a Li—Na alloy, a Li—K alloy, a Li—Te alloy, a Li—Mo alloy, a Li—Sn—Bi alloy, a Li—Sn—Ag alloy, a Li—Sn—Na alloy, a Li—Sn—K alloy, a Li—Sn—Ca alloy, a Li—Te—Ag alloy, a Li—Sb—Ag alloy, a Li—Sn—Sb alloy, a Li—Sn—V alloy, a Li—Sn—Ni alloy, a Li—Sn—Cu alloy, a Li—Sn—Zn alloy, a Li—Sn—Ga alloy, a Li—Sn—Ge alloy, a Li—Sn—Sr alloy, a Li—Sn—Y alloy, a Li—Sn—Ba alloy, a Li—Sn—Au alloy, a Li—Sn—La alloy, a Li—Al—Ga alloy, a Li—Mg—Sn alloy, a Li—Mg—Al alloy, a Li—Mg—Si alloy, a Li—Mg—Zn alloy, a Li—Mg—Ga alloy, a Li—Mg—Ag alloy, or a combination thereof.

10. The anode-solid electrolyte sub-assembly of claim 1, wherein the first metal material is a Li—Ag alloy, a Li—Au alloy, a Li—Al alloy, a Li—Sn alloy, a Li—In alloy, a Li—Zn alloy, a Li—Ge alloy, a Li—Ga alloy, a Li—Si alloy, a Li—Sb alloy, a Li—Bi alloy, a Li—Mg alloy, a Li—Na alloy, a Li—K alloy, a Li—Te alloy, a Li—Mo alloy, a Li—Sn—Bi alloy, a Li—Sn—Ag alloy, a Li—Sn—Na alloy, a Li—Sn—K alloy, a Li—Sn—Ca alloy, a Li—Te—Ag alloy, a Li—Sb—Ag alloy, a Li—Sn—Sb alloy, a Li—Sn—V alloy, a Li—Sn—Ni alloy, a Li—Sn—Cu alloy, a Li—Sn—Zn alloy, a Li—Sn—Ga alloy, a Li—Sn—Ge alloy, a Li—Sn—Sr alloy, a Li—Sn—Y alloy, a Li—Sn—Ba alloy, a Li—Sn—Au alloy, a Li—Sn—La alloy, a Li—Al—Ga alloy, a Li—Mg—Sn alloy, a Li—Mg—Al alloy, a Li—Mg—Si alloy, a Li—Mg—Zn alloy, a Li—Mg—Ga alloy, a Li—Mg—Ag alloy, or a combination thereof.

11. The anode-solid electrolyte sub-assembly of claim 1, wherein the interlayer comprises LiF and LixSn, wherein $0<x<5$, and wherein the LiF and LixSn have a particle size of about 0.1 nanometer to about 300 nanometers, and wherein the first anode active material layer comprises the lithium metal and $Li_ySn$, wherein $0<y<5$, wherein the lithium metal and $Li_ySn$ have a particle size of about 0.1 micrometer to about 20 micrometers.

12. The anode-solid electrolyte sub-assembly of claim 1, wherein a content of the lithium ion conductor in the composite of the interlayer is about 0.1 part by weight to about 95 parts by weight, based on 100 parts by weight of the composite, and a content of the lithium alloy in the first anode active material layer is about 0.1 part by weight to about 95 parts by weight, based on 100 parts by weight of the first anode active material layer.

13. The anode-solid electrolyte sub-assembly of claim 1, wherein the first metal material of the interlayer is a lithium alloy, and the lithium alloy comprises a same composition as a composition of the lithium alloy of the first anode active material layer.

14. An all-solid secondary battery comprising:

a cathode, and the anode-solid electrolyte sub-assembly of claim 1 on the cathode.

15. The all-solid secondary battery of claim 14, wherein the solid electrolyte comprises an oxide solid electrolyte, a sulfide solid electrolyte, or a combination thereof.

16. The all-solid secondary battery of claim 14, wherein the oxide solid electrolyte is an oxide represented by Formula 2

$$Li_{3+x}La_3Zr_{2-a}M_aO_{12} \tag{Formula 2}$$

wherein, in Formula 2,

M is Al, Ga, In, Si, Ge, Sn, Sb, Bi, Sc, Y, Ti, Hf, V, Nb, Ta, W, or a combination thereof, x is a number of 1 to 10, and $0 \leq a < 2$, and wherein the sulfide solid electrolyte is $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are each a positive number, and Z is one of Ge, Zn, or Ga, $Li_2S$—$GeS_2$, $Li_2S$—$SiS_2$—$Li_3PO_4$, $Li_2S$—$SiS_2$-$Li_pMO_q$ wherein p and q are each a positive number, and M is one of P, Si, Ge, B, Al, Ga, or In, $Li_{7-x}PS_{6-x}Cl_x$ wherein $0<x<2$, $Li_{7-x}PS_{6-x}Br_x$ wherein $0<x<2$, $Li_{7-x}PS_{6-x}I_x$ wherein $0<x<2$, or a combination thereof.

17. A method of manufacturing an all-solid secondary battery, the method comprising:

providing a cathode;

disposing a solid electrolyte on the cathode; and disposing an anode on the solid electrolyte opposite the cathode, wherein the disposing of the anode comprises providing a composition comprising a compound of a first metal and a halogen on a first surface of the solid electrolyte to provide a composite layer, disposing lithium metal on the composite layer to form a lithium coated composite layer, heat treating the lithium coated composite layer to form an interlayer, wherein the interlayer comprises a first metal material having a particle size of about 0.1 nanometer to about 300 nanometers and a lithium ion conductor, and disposing a first anode active material layer on a surface of the interlayer that faces an anode current collector, the first anode active material layer being positioned between the interlayer and the anode current collector, to dispose the anode, resulting in an anode-solid electrolyte sub-assembly, and to manufacture the all-solid secondary battery, wherein the first anode active material layer comprises a lithium metal, a lithium alloy, or a combination thereof, and wherein the lithium metal or the lithium alloy have a particle size of about 0.1 micrometer to about 20 micrometers, and the anode-solid electrolyte sub-assembly comprises an anode current collector;

an anode material layer on the anode current collector; and a solid electrolyte on the anode material layer and opposite the current collector, wherein the anode material layer comprises an interlayer, which contacts the solid electrolyte and comprises a composite comprising a first metal material, and a lithium ion conductor; and a first anode active material layer disposed on a surface of the interlayer that faces the anode current collector, the first anode active material layer being positioned between the interlayer and the anode current collector, the first anode active material layer comprising a lithium metal, a lithium alloy, or a combination thereof, wherein the lithium metal or the lithium alloy have a particle size greater than the particle size of the first metal material, and wherein the first metal material comprises a first metal that forms an alloy or a compound with lithium, a lithium-first metal alloy comprising the first metal and lithium, or a combination thereof.

18. The method of claim 17, wherein the heat treating comprises heat treating at a temperature of greater than about 150° C.

19. The method of claim 17, wherein the composition comprising the compound of the first metal and the halogen further comprises a solvent, and wherein the compound of the first metal and the halogen is $SnF_x$ wherein $0<x\le6$, $SnCl_x$ wherein $0<x\le6$, $SnBr_x$ wherein $0<x<6$, $SnI_x$ wherein $0<x\le6$, $BiCl_3$, $Bi_6Cl_7$, $BiBr_x$ wherein $0<x\le6$, $BiF_x$ wherein $0<x\le6$, $BiI_x$ wherein $0<x\le6$, $AgF_x$ wherein $0<x\le4$, $AgCl_x$ wherein $0<x\le2$, $AgBr_x$ wherein $0<x\le2$, $AgI_x$ wherein $0<x\le2$, or a combination thereof.

20. The method of claim 17, wherein the providing of the composite layer comprises coating the compound comprising the first metal and the halogen on the first surface of the solid electrolyte to provide a coated solid electrolyte, and drying the coated solid electrolyte at about 30° C. to about 80° C. to provide the composite layer.

\* \* \* \* \*